United States Patent
Nakayama

(10) Patent No.: US 9,145,473 B2
(45) Date of Patent: Sep. 29, 2015

(54) OPTICAL MEMBER, POLYIMIDE, METHOD FOR MANUFACTURING OPTICAL MEMBER, AND METHOD FOR PRODUCING POLYIMIDE

(75) Inventor: Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/581,098

(22) PCT Filed: Feb. 23, 2011

(86) PCT No.: PCT/JP2011/054670
§ 371 (c)(1),
(2), (4) Date: Aug. 24, 2012

(87) PCT Pub. No.: WO2011/105614
PCT Pub. Date: Sep. 1, 2011

(65) Prior Publication Data
US 2012/0314294 A1    Dec. 13, 2012

(30) Foreign Application Priority Data

| Feb. 26, 2010 | (JP) | 2010-043332 |
| May 26, 2010 | (JP) | 2010-121000 |
| Feb. 3, 2011 | (JP) | 2011-022042 |

(51) Int. Cl.
*G02B 1/10* (2015.01)
*C08G 73/10* (2006.01)
(Continued)

(52) U.S. Cl.
CPC *C08G 73/10* (2013.01); *G02B 1/04* (2013.01); *G02B 1/118* (2013.01); *Y10T 428/24355* (2015.01)

(58) Field of Classification Search
CPC ........... C08G 73/10; C08G 73/1007; C08G 73/1035; C08G 73/1068; C08G 2261/216; C08L 79/08; G02B 1/04; G02B 1/10; G02B 1/118; Y10T 428/24355; Y10T 428/24372
USPC ................................................. 428/141, 143
See application file for complete search history.

(56) References Cited

U.S. PATENT DOCUMENTS
5,346,979 A   9/1994 Okinoshima et al.
(Continued)

FOREIGN PATENT DOCUMENTS
CN         101646960 A      2/2010
(Continued)

OTHER PUBLICATIONS
JP 2005-146072 A. Japanese to English Machine Translation. Jun. 9, 2005.*
(Continued)

*Primary Examiner* — Maria Veronica Ewald
*Assistant Examiner* — Nancy Johnson
(74) *Attorney, Agent, or Firm* — Canon U.S.A. Inc., IP Division

(57) ABSTRACT

There is provided an optical member that can retain a high antireflection effect on a substrate for a long time.
The optical member includes a laminated body that can reduce the reflection of light formed on a substrate surface, wherein at least one layer of the laminated body is a polyimide layer containing a polyimide film, and the polyimide contains a repeating unit represented by the following general formula (1), and a 1,4-cyclohexylene group in the main chain of $R_2$ in the general formula (1) contains 90% by mole or more of a trans-1,4-cyclohexylene group:

[Chem. 1]

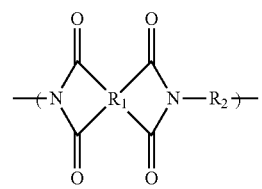

(1)

wherein $R_1$ denotes a tetravalent organic group, and $R_2$ denotes a divalent organic group having one or two or more 1,4-cyclohexylene groups in the main chain.

7 Claims, 4 Drawing Sheets

(51) Int. Cl.
*G02B 1/04* (2006.01)
*G02B 1/118* (2015.01)

(56) References Cited

U.S. PATENT DOCUMENTS

| 6,313,233 | B1 | 11/2001 | Kurosawa et al. |
| 2008/0310026 | A1 | 12/2008 | Nakayama |

FOREIGN PATENT DOCUMENTS

| CN | 101852873 A | 10/2010 |
| EP | 2237078 | 10/2010 |
| JP | 61-171762 A | 8/1986 |
| JP | H04-248837 A | 9/1992 |
| JP | 2002-161136 A | 6/2002 |
| JP | 2002-167433 A | 6/2002 |
| JP | 2005-146072 A | 6/2005 |
| JP | 2005-163012 A | 6/2005 |
| JP | 2005-187768 A | 7/2005 |
| JP | 2005-330421 A | 12/2005 |
| JP | 2007-169304 A | 7/2007 |
| JP | 2007-183388 A | 7/2007 |
| JP | 3972600 B2 | 9/2007 |
| JP | 2007-313739 A | 12/2007 |
| JP | 2008-031268 A | 2/2008 |
| JP | 2008-050567 A | 3/2008 |
| JP | 2008-233880 A | 10/2008 |
| WO | 2005/047367 A1 | 5/2005 |
| WO | 2010/100874 A1 | 9/2010 |

OTHER PUBLICATIONS

U.S. Appl. No. 13/349,896, filed Jan. 13, 2012, Tomonari Nakayama.
K. Tadanaga, N. Katata, and T. Minami: "Super-Water-Repellent Al2O3 Coating Films with High Transparency," J. Am. Ceram. Soc., 80 [4] 1040-42 (1997).

* cited by examiner

OPTICAL MEMBER, POLYIMIDE, METHOD FOR MANUFACTURING OPTICAL MEMBER, AND METHOD FOR PRODUCING POLYIMIDE

TECHNICAL FIELD

The present invention relates to an antireflective optical member and a method for manufacturing the antireflective optical member and, more particularly, to an optical member suitable to stably achieve high antireflection performance from a visible region to a near-infrared region for a long time, a polyimide, a method for manufacturing the optical member, and a method for producing the polyimide.

BACKGROUND ART

Polyimides are used in electronic components and electrical machinery components because of their high heat resistance and excellent electrical insulating properties. Transparent polyimides having an aliphatic structure are used also in liquid crystal display elements. However, the introduction of the aliphatic structure to impart transparency to a polyimide can lower the heat resistance and the mechanical characteristics of the polyimide. Thus, a polyimide having high transparency, high heat resistance, and excellent mechanical characteristics has been synthesized by introducing a specific alicyclic structure (see PTL 1). A polyimide having high transparency, high heat resistance, and excellent mechanical characteristics has been synthesized by using a substantially planar diamine, such as trans-1,4-cyclohexanediamine (see PTL 2). However, use of trans-1,4-cyclohexanediamine made polymerization difficult because of the formation of a salt during polymerization. Thus, the formation of a salt must be reduced, for example, by silylation of the diamine.

It is also known that a polyimide produced using pyromellitic acid and 4,4'-methylenebis(aminocyclohexane) has high transparency, high heat resistance, and excellent mechanical characteristics (see PTL 3). However, the polyimide produced by this method has low solubility. Thus, a film of the polyimide must be manufactured by heat treatment of a film of a precursor, such as polyamic acid, at high temperature. This causes problems, such as thermal damage to a substrate and degradation of transparency because of the yellow coloration of the polyimide. Thus, there is a demand for a polyimide that is easy to synthesize, has high transparency and heat resistance, and can be processed without causing thermal damage to neighboring members.

In an antireflective structure having a periodic fine structure having a pitch less than or equal to a wavelength in a visible light region, it is known that the formation of a periodic fine structure having an appropriate pitch and height results in high antireflection performance in a wide wavelength range. A known method for forming a periodic fine structure includes the application of a film in which fine particles having a size less than or equal to the wavelength are dispersed. In particular, it is known that a textured structure formed of aluminum oxide boehmite grown on a glass substrate has a high antireflection effect. This textured structure formed of boehmite is produced by steam treatment or hot-water immersion treatment of an aluminum oxide film, for example, formed by a liquid phase method (a sol-gel method) (see NPL 1). However, exposure to water vapor or hot water can cause damage to the glass substrate.

It is known that polyimides can be transparent, have a variable refractive index, and protect a glass substrate from damage caused by water or water vapor (see PTL 4). However, it is difficult to produce a polyimide that is easy to synthesize and has high transparency and heat resistance. In order to manufacture a low-reflectance optical member, there is a demand for an optical thin film that has small variations in thickness and optical properties.

A porous film that contains fine particles deposited on the surface layer as an antireflection coating and a metal oxide or halogenated metal layer formed by a method of growing boehmite on a substrate are convenient and have high productivity and excellent optical performance. On the other hand, the porous film and the metal oxide or halogenated metal layer have low density and many voids. Thus, water from the outside can easily reach the substrate, often causing erosion of the substrate or the elution of substrate components, such as alkali ions. Thus, there is a demand for a thin-film material that can be applied between a porous film or a boehmite film and a substrate to improve antireflection performance and reduce damage to the substrate. Furthermore, there is a demand for a high-performance antireflection-coated optical member without cracking or film irregularities caused by a variation in film thickness or optical properties resulting from the effects of heat or water.

CITATION LIST

Patent Literature

PTL 1 Japanese Patent Laid-Open No. 2002-161136
PTL 2 Japanese Patent Laid-Open No. 2005-146072
PTL 3 Japanese Patent Laid-Open No. 2007-313739
PTL 4 U.S. Patent Application Publication 2008/0310026

Non Patent Literature

NPL 1 K. Tadanaga, N. Katata, and T. Minami: "Super-Water-Repellent Al2O3 Coating Films with High Transparency", J. Am. Ceram. Soc., 80[4], 1040-1042 (1997)

SUMMARY OF INVENTION

Technical Problem

In view of such background art, the present invention provides an optical member that has a high antireflection effect on a substrate for a long time and a method for manufacturing the optical member. The present invention also provides a polyimide that can retain transparency after processing into a membrane or film, has a sufficiently high glass transition temperature, and is soluble in organic solvents, and a method for producing the polyimide.

Solution to Problem

An optical member that can solve the problems described above includes a laminated body that can reduce the reflection of light formed on a substrate surface, wherein at least one layer of the laminated body is a polyimide layer containing a polyimide film, and the polyimide contains a repeating unit represented by the following general formula (1), and a 1,4-cyclohexylene group in the main chain of $R_2$ in the general formula (1) contains 90% by mole or more of a trans-1,4-cyclohexylene group:

[Chem. 1]

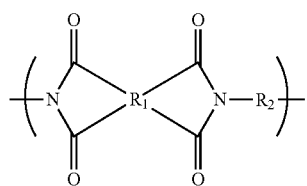

wherein $R_1$ denotes a tetravalent organic group, and $R_2$ denotes a divalent organic group having one or two or more 1,4-cyclohexylene groups in the main chain.

A method for manufacturing an optical member that can solve the problems described above is a method for manufacturing an optical member including a laminated body that can reduce the reflection of light formed on a substrate surface, including 1) purifying a diamine represented by the following general formula (3) such that a 1,4-cyclohexylene group in the main chain of $R_2$ in the general formula (3) contains 90% by mole or more of a trans-1,4-cyclohexylene group;

[Chem. 2]

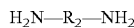  (3)

wherein $R_2$ denotes a divalent organic group having one or two or more 1,4-cyclohexylene groups in the main chain, 2) producing a polyimide containing a repeating unit represented by the following general formula (1) by the reaction of the purified diamine with an acid dianhydride represented by the following general formula (4) in a solvent;

[Chem. 3]

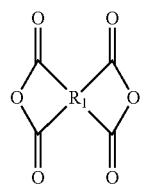  (4)

wherein $R_1$ denotes a tetravalent organic group,

[Chem. 4]

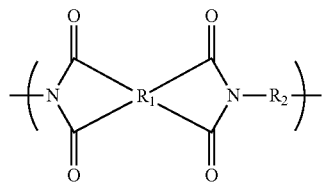  (1)

wherein $R_1$ and $R_2$ are as described above, 3) applying a solution containing the polyimide to the substrate or a thin film formed on the substrate; and 4) drying and/or firing the applied solution containing the polyimide at 100° C. or more and 250° C. or less to form a polyimide layer.

A polyimide that can solve the problems described above has a repeating unit represented by the following general formula (1), wherein 90% by mole or more of a 1,4-cyclohexylene group in the general formula (1) has a trans form:

[Chem. 5]

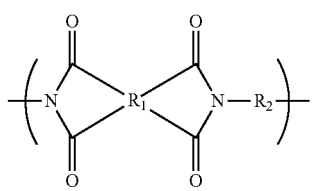  (1)

wherein $R_1$ denotes a tetravalent organic group, and $R_2$ denotes a divalent organic group having one or two or more 1,4-cyclohexylene groups in the main chain.

A method for producing a polyimide that can solve the problems described above includes purifying a diamine represented by the following general formula (3) such that 90% by mole or more of a 1,4-cyclohexylene group in the general formula (3) has a trans form;

[Chem. 6]

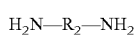  (3)

wherein $R_2$ denotes a divalent organic group having one or two or more 1,4-cyclohexylene groups in the main chain, producing a polyimide precursor by the reaction between the diamine represented by the general formula (3) purified and an acid dianhydride represented by the following general formula (4) in a solvent;

[Chem. 7]

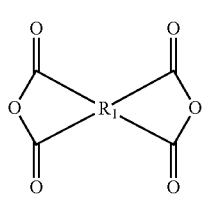  (4)

wherein $R_1$ denotes a tetravalent organic group, producing a polyimide by the imidization of the polyimide precursor in a solvent; and isolating the polyimide by removing the solvent.

The present invention can provide an optical member that can retain a high antireflection effect on a substrate for a long time. The present invention can also provide a method for manufacturing the optical member. The present invention can also provide a polyimide that can retain transparency after processing into a membrane or film, has a sufficiently high glass transition temperature, and is soluble in organic solvents, and a method for producing the polyimide.

Further features of the present invention will become apparent from the following description of exemplary embodiments with reference to the attached drawings.

DESCRIPTION OF EMBODIMENTS

The present invention will be described in detail below.

An optical member according to an embodiment of the present invention includes a laminated body that can reduce the reflection of light formed on a substrate surface, wherein at least one layer of the laminated body is a polyimide layer containing a polyimide film, and the polyimide contains a repeating unit represented by the following general formula (1), and a 1,4-cyclohexylene group in the main chain of $R_2$ in the general formula (1) contains 90% by mole or more of a trans-1,4-cyclohexylene group:

[Chem. 8]

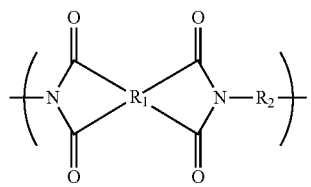

(1)

wherein $R_1$ denotes a tetravalent organic group, and $R_2$ denotes a divalent organic group having one or two or more 1,4-cyclohexylene groups in the main chain.

The polyimide can contain a repeating unit represented by the following general formula (2):

[Chem. 9]

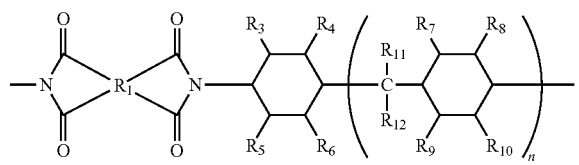

(2)

wherein $R_1$ denotes a tetravalent organic group, n denotes an integer in the range of 0 to 2, $R_3$ to $R_{10}$ independently denote a hydrogen atom, a halogen atom, a phenyl group, or a linear or cyclic alkyl, alkenyl, or alkynyl group having 1 to 6 carbon atoms, and $R_{11}$ and $R_{12}$ independently denote a hydrogen atom or a linear or cyclic alkyl group having 1 to 6 carbon atoms.

Figure 1:
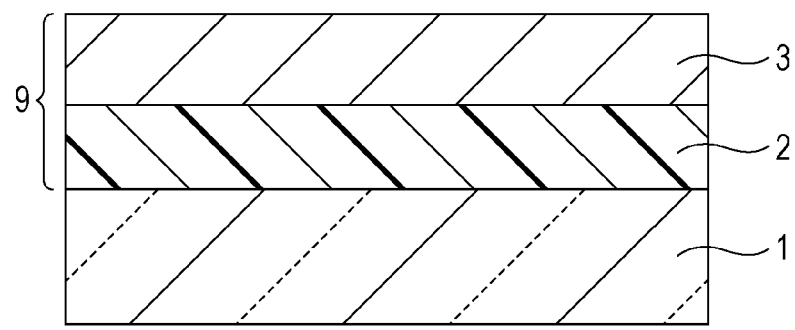
FIG. 1 is a schematic view of an optical member according to an embodiment of the present invention.

FIG. 1 is a schematic view of an optical member according to an embodiment of the present invention. In FIG. 1, the optical member according to this embodiment of the present invention includes a polyimide layer 2 containing a polyimide and a low-refractive index layer 3 on a surface of a substrate 1 in this order.

A laminated body 9 composed of the polyimide layer 2 and the low-refractive index layer 3 can reduce the reflection of light on the surface of the substrate 1. The polyimide layer is formed of a polyimide alone or a polyimide and a component other than the polyimide. The component other than the polyimide complements the polyimide and is compatible with, can be mixed with, or can be dispersed in the polyimide within the bounds of not impairing the characteristics of the polyimide.

The formation of the polyimide layer 2 between the substrate 1 and the low-refractive index layer 3 can produce a higher antireflection effect than the formation of the low-refractive index layer 3 directly on the substrate 1. The thickness of the polyimide layer 2 is 10 nm or more and 150 nm or less, preferably 20 nm or more and 80 nm or less, and depends on the refractive index of the substrate. The polyimide layer 2 having a thickness below 10 nm has little antireflection effect. The polyimide layer 2 having a thickness above 150 nm has a markedly reduced antireflection effect.

The polyimide contained in the polyimide layer 2 has a repeating unit represented by the following general formula (1):

[Chem. 10]

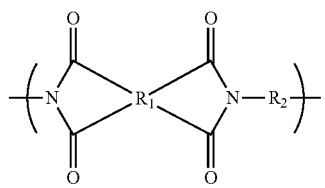

(1)

wherein $R_1$ denotes a tetravalent organic group, and $R_2$ denotes a divalent organic group having one or two or more 1,4-cyclohexylene groups in the main chain. Most of the 1,4-cyclohexylene group, more specifically, 90% by mole or more of the 1,4-cyclohexylene group in the main chain of $R_2$ can be a trans-1,4-cyclohexylene group.

The divalent organic group having one or two or more 1,4-cyclohexylene groups in $R_2$ in the polyimide can impart transparency and a low refractive index to the polyimide without lowering the heat resistance of the polyimide. Although an aliphatic group in $R_2$ in the polyimide can reduce the refractive index of the polyimide, linear aliphatic groups or alicyclic groups other than the 1,4-cyclohexylene group lower the glass transition temperature of the polyimide. 1,4-cyclohexylene can be directly bonded to the nitrogen atom of an imide ring in the polyimide. The polyimide can contain a repeating unit represented by the following general formula (2):

[Chem. 11]

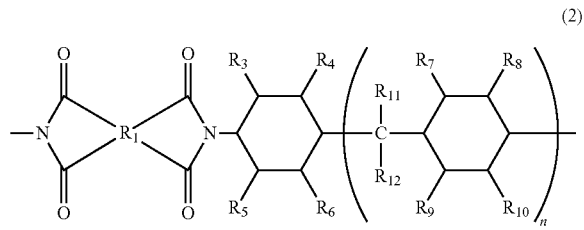

(2)

wherein $R_1$ denotes a tetravalent organic group, n denotes an integer in the range of 0 to 2, $R_3$ to $R_{10}$ independently denote a hydrogen atom, a halogen atom, a phenyl group, or a linear or cyclic alkyl, alkenyl, or alkynyl group having 1 to 6 carbon atoms, and $R_{11}$ and $R_{12}$ independently denote a hydrogen atom or a linear or cyclic alkyl group having 1 to 6 carbon atoms.

The polyimide may further have a repeating unit represented by the following general formula (5).

[Chem. 12]

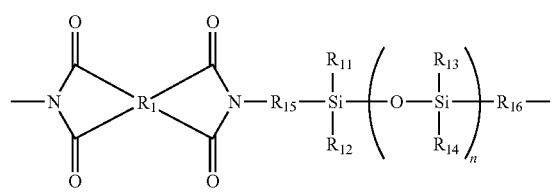

(5)

wherein $R_1$ denotes a tetravalent organic group, $R_{11}$ to $R_{14}$ independently denote a hydrogen atom, a phenyl group, or an alkyl, alkenyl, or alkynyl group having 1 to 4 carbon atoms, $R_{11}$ to $R_{14}$ may be the same or different, $R_{15}$ and $R_{16}$ independently denote a phenylene group or an alkylene group having 1 to 4 carbon atoms, $R_{15}$ and $R_{16}$ may be the same or different, and n denotes an integer in the range of 0 to 6.

The repeating unit represented by the general formula (5) can improve the solubility of the polyimide. The repeating unit represented by the general formula (5) can also improve the adhesion of a film made of the polyimide.

A 1,4-cyclohexylene group can be introduced into $R_2$ in the polyimide by using a diamine represented by the following general formula (3) having a 1,4-cyclohexylene group or a derivative of the diamine as a monomer:

[Chem. 13]

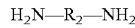

(3)

wherein $R_2$ denotes a divalent organic group having one or two or more 1,4-cyclohexylene groups in the main chain.

A diamine represented by the following general formula (6) or a derivative thereof can be used as a monomer:

[Chem. 14]

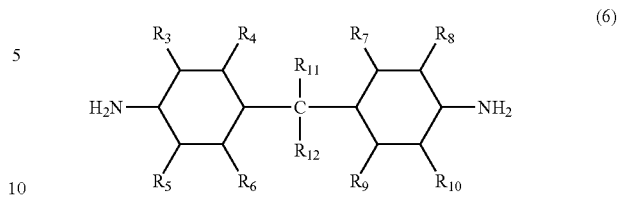

(6)

wherein $R_3$ to $R_{10}$ independently denote a hydrogen atom, a halogen atom, a phenyl group, or a linear or cyclic alkyl, alkenyl, or alkynyl group having 1 to 6 carbon atoms, and $R_{11}$ and $R_{12}$ independently denote a hydrogen atom or a linear or cyclic alkyl group having 1 to 6 carbon atoms.

Examples of the diamine having a 1,4-cyclohexylene group include, but are not limited to, 1,4-cyclohexanediamine, 1,4-bis(aminomethyl)cyclohexane, 4,4'-methylenebis(aminocyclohexane), 4,4'-methylenebis(1-amino-2-methylcyclohexane), 2,2-bis(4-aminocyclohexyl)propane, 4,4'-bicyclohexylamine, and α,α'-bis(4-aminocyclohexyl)-1,4-diisopropylcyclohexane.

The diamine having a 1,4-cyclohexylene group is generally synthesized by the hydrogenation of an aromatic diamine. The diamine synthesized contains a mixture of a trans-1,4-cyclohexylene group and a cis-1,4-cyclohexylene group due to cis-trans isomerization. For example, a diamine having one 1,4-cyclohexylene group, such as 1,4-cyclohexanediamine, contains a mixture of a structural isomer only having a trans form and a structural isomer only having a cis form. A diamine having two 1,4-cyclohexylene groups, such as 4,4'-methylenebis(aminocyclohexane), contains a mixture of a structural isomer only having the trans form, a structural isomer only having the cis form, and a structural isomer (or stereoisomer) having one trans form and one cis form.

Thus, a polyimide synthesized using the diamine having a 1,4-cyclohexylene group described above without purification contains both the trans-1,4-cyclohexylene group and the cis-1,4-cyclohexylene group. The heat resistance and the mechanical characteristics of the polyimide depend on the ratio of the structural isomer having the trans form to the structural isomer having the cis form.

The expression "most of the 1,4-cyclohexylene group in the polyimide has the trans form" indicates that the 1,4-cyclohexylene group in the polyimide skeleton has the trans form alone or a mixture of the trans form and a small amount of cis form. The polyimide in which most of the 1,4-cyclohexylene group has the trans form has a higher glass transition temperature (Tg) than a polyimide in which most of the 1,4-cyclohexylene group has the cis form. Thus, a film made of the polyimide in which most of the 1,4-cyclohexylene group has the trans form has a higher strength.

The polyimide layer 2 has a very small thickness of 100 nm or less. A change as small as several nanometers in the thickness of the polyimide layer 2 therefore results in deterioration of the optical properties of an optical member according to an embodiment of the present invention. Since a thin film having such a thickness has a lower density than thin films having larger thicknesses, the thin film absorbs water in the manufacturing process or in the environment, causing an increase in film thickness and variations in refractive index. This can cause uneven surface reflectance or cracking of an optical member. In the case that most of the 1,4-cyclohexylene group in the polyimide has the trans form, the polyimide having a thickness of 100 nm or less has smaller variations in thickness or refractive index resulting from moisture absorption. This causes smaller variations in the optical properties of an optical member according to an embodiment of the present invention. This is probably because the trans-1,4-cyclohexylene group in the polyimide can be stacked on top of each other and thereby prevent water intrusion.

The polyimide in $R_2$ in which most of the 1,4-cyclohexylene group has the trans form is produced by using a diamine only having the trans-1,4-cyclohexylene group as a monomer. The diamine is produced by the purification of a mixture of structural isomers. The diamine only having the trans-1,4-cyclohexylene group can be isolated from a mixture of structural isomers by the recrystallization of only a high-crystallinity trans form in a solvent, distillation under reduced pressure utilizing different boiling points of the isomers, extraction or washing utilizing different solubilities of the isomers in a particular solvent, or chromatography.

However, it is difficult to completely isolate the diamine only having the trans-1,4-cyclohexylene group by these methods, and a small amount of diamine having the cis-1,4-cyclohexylene group remains. Thus, isolation conditions must be optimized or isolation procedures must be repeatedly performed so that most of the 1,4-cyclohexylene group has the trans form.

It is desirable that the 1,4-cyclohexylene group in the main chain of $R_2$ in the general formula (1) contain 90% by mole or more, preferably 93% by mole or more and 100% by mole or less, of the trans-1,4-cyclohexylene group. More specifically, the trans/cis ratio of the 1,4-cyclohexylene group in the polyimide may be at least 9/1 (mol/mol). The trans/cis ratio lower than 9/1 results in insufficient prevention of water intrusion and a marked increase in film thickness. Thus, the trans/cis ratio of the 1,4-cyclohexylene group in the diamine having the 1,4-cyclohexylene group corresponding to the polyimide skeleton can also be at least 9/1 (mol/mol).

The polyimide is synthesized by the polyaddition reaction between the diamine represented by the general formula (3) in which most of the 1,4-cyclohexylene group has the trans form and the acid dianhydride represented by the general formula (4) and a dehydration condensation reaction (imidization reaction). Thus, the type of tetravalent organic group of $R_1$ in the general formula (1) is determined in accordance with the type of the acid dianhydride represented by the following general formula (4):

[Chem. 15]

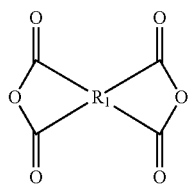

(4)

wherein $R_1$ denotes the tetravalent organic group.

The $R_1$ can be a tetravalent organic group represented by any of the following general formulae (7) to (11).

[Chem. 16]

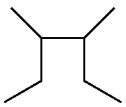

(7)

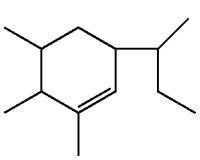

(8)

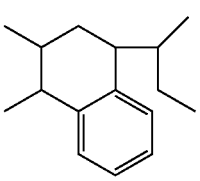

(9)

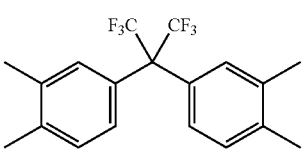

(10)

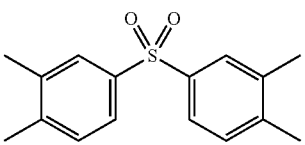

(11)

Examples of the acid dianhydride used in the synthesis of polyimides include, but are not limited to, aromatic acid dianhydrides, such as pyromellitic acid anhydride, 3,3'-biphthalic acid anhydride, 3,4'-biphthalic acid anhydride, 3,3',4,4'-benzophenonetetracarboxylic acid dianhydride, 3,3',4,4'-diphenylsulfonetetracarboxylic acid dianhydride, 4,4'-(hexafluoroisopropylidene)diphthalic acid anhydride, and 4,4'-oxydiphthalic acid dianhydride, and aliphatic acid dianhydrides, such as meso-butane-1,2,3,4-tetracarboxylic acid dianhydride, 1,2,3,4-cyclobutanetetracarboxylic acid dianhydride, 1,2,3,4-cyclopentanetetracarboxylic acid dianhydride, 1,2,4,5-cyclohexanetetracarboxylic acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride, bicyclo[2.2.1]heptane-2,3,5,6-tetracarboxylic acid dianhydride, 5-(2,5-dioxotetrahydrofuryl)-3-methyl-3-cyclohexene-1,2-dicarboxylic anhydride, and 4-(2,5-dioxotetrahydrofuran-3-yl)-1,2,3,4-tetrahydronaphthalene-1,2-dicarboxylic anhydride. In order to improve the solubility, coating performance, and transparency of polyimides, the acid dianhydride may be 3,3',4,4'-diphenylsulfonetetracarboxylic acid dianhydride, 4,4'-(hexafluoroisopropylidene) diphthalic acid dianhydride, meso-butane-1,2,3,4-tetracarboxylic acid dianhydride, bicyclo[2.2.2]octane-2,3,5,6-tetracarboxylic acid dianhydride, bicyclo[2.2.1]heptane-2,3,5,6-tetracarboxylic acid dianhydride, 5-(2,5-dioxotetrahydrofuryl)-3-methyl-3-cyclohexene-1,2-dicarboxylic anhydride, or 4-(2,5-dioxotetrahydrofuran-3-yl)-1,2,3,4-tetrahydronaphthalene-1,2-dicarboxylic anhydride.

In addition to the diamine in which most of the 1,4-cyclohexylene group has the trans form, one or more other diamines may be used in the polymerization. In order to achieve high adhesion to an inorganic substrate, such as glass, and a low refractive index, a diamine represented by the general formula (12) may be used.

[Chem. 17]

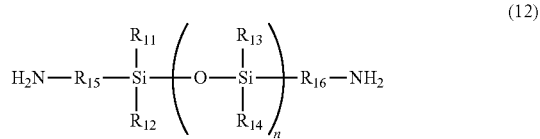

(12)

wherein $R_{11}$ to $R_{14}$ independently denote a hydrogen atom, a phenyl group, or an alkyl, alkenyl, or alkynyl group having 1 to 4 carbon atoms, $R_{11}$ to $R_{14}$ may be the same or different, $R_{15}$ and $R_{16}$ independently denote a phenylene group or an alkylene group having 1 to 4 carbon atoms, $R_{15}$ and $R_{16}$ may be the same or different, and n denotes an integer in the range of 0 to 6.

Examples of the alkyl group having 1 to 4 carbon atoms include, but are not limited to, a methyl group, an ethyl group, a propyl group, an isopropyl group, a butyl group, an isobutyl group, a sec-butyl group, and a tert-butyl group. Examples of the alkenyl group include, but are not limited to, an ethenyl group and an allyl group. Examples of the alkynyl group include, but are not limited to, an ethynyl group and a propargyl group. Examples of the alkylene group having 1 to 4 carbon atoms include, but are not limited to, a methylene group, an ethylene group, an ethylidene group, a propylene group, an isopropylidene group, and a butylene group.

Specific examples of the diamine represented by the general formula (12) include, but are not limited to, organosiloxane diamines. Examples of the organosiloxane diamines include, but are not limited to, diamines having a diorganosiloxane group, such as 1,3-bis(3-aminopropyl)tetramethyldisiloxane, 1,4-bis(3-aminopropyldimethylsilyl)benzene, and dimethylsiloxane oligomers having an amino group at both ends.

Polyimides having an organosiloxane group through an organosiloxane diamine have higher transparency, a lower refractive index, and narrower optical dispersion than polyimides only having a hydrocarbon group. Polyimides only having an organosiloxane group are highly hydrophobic and have a low Tg because of their flexible structure. Films formed of such polyimides are therefore brittle. However, a combined use of a repeating unit having the trans-1,4-cyclohexylene group and a repeating unit having the organosiloxane group can provide a polyimide having a low refractive index and narrow optical dispersion without lowering the Tg of the polyimide. The combined use can also impart high solubility in organic solvents to the polyimide. The ratio of the amount of diamine represented by the general formula (12) to the amount of diamine represented by the general formula (3) used in the reaction described above may be 0.05 or more and 1 or less (mol/mol). The ratio of the amount of acid dianhydride represented by the general formula (4) to the total amount of diamine represented by the general formula (3) and diamine represented by the general formula (12) used in the reaction described above may be 0.94 or more and 1.06 or less (mol/mol). If these ratios fall outside these ranges, the polymerization proceeds insufficiently, and an amino group or a carboxy group remains at an end of the polyimide, possibly causing moisture absorption or coloring of the polyimide.

Examples of a third diamine for use in the synthesis of the polyimide other than diamines in which most of the 1,4-cyclohexylene group has the trans form include, but are not limited to, aromatic diamines, such as m-phenylenediamine, p-phenylenediamine, 3,4'-diaminodiphenylmethane, 4,4'-diaminodiphenylmethane, 4,4'-diamino-3,3'-dimethyldiphenylmethane, o-tolidine, m-tolidine, 4,4'-diaminobenzophenone, 1,1-bis(4-aminophenyl)cyclohexane, 3,4'-diaminodiphenyl ether, 4,4'-diaminodiphenyl ether, 1,4-bis(4-aminophenoxy)benzene, 1,3-bis(4-aminophenoxy)benzene, 2,2-bis[4-(4-aminophenoxy)phenyl]propane, 4,4'-bis(4-aminophenoxy)biphenyl, bis[4-(4-aminophenoxy)phenyl]sulfone, 4,4'-bis(3-aminophenoxy)biphenyl, bis[4-(4-aminophenoxy)phenyl]sulfone, 9,9-bis(4-aminophenyl)fluorene, 9,9-bis(4-amino-3-methylphenyl)fluorene, 9,9-bis(4-amino-3-fluorophenyl)fluorene, 2,2-bis(4-aminophenyl)hexafluoropropane, 2,2-bis(3-aminophenyl)hexafluoropropane, 2,2-bis[4-(4-aminophenoxy)phenyl]hexafluoropropane, and 2,2'-bis(trifluoromethyl)benzidine. Polyimides produced by the copolymerization with a diamine having an aromatic group can have a refractive index in the range of 1.5 to 1.7.

In particular, a combination with a diamine having a 1,4-cyclohexylene group and/or a diamine having an organosiloxane group allows wide control of the refractive index. Thus, 4,4'-bis(3-aminophenoxy)biphenyl, 9,9-bis(4-aminophenyl)fluorene, 9,9-bis(4-amino-3-methylphenyl)fluorene, and 9,9-bis(4-amino-3-fluorophenyl)fluorene can be used.

Diamines having a linear or branched aliphatic group, such as 1,4-diaminobutane, 1,5-diaminopentane, and 1,3-cyclohexanediamine unfavorably reduce the Tg of the polyimide.

The refractive index ni of the polyimide layer 2, the refractive index nb of the substrate 1, and the refractive index ns of the low-refractive index layer 3 can satisfy the relationship of nb≥ni≥ns. The refractive index ns of the low-refractive index layer 3 may continuously increase from the top toward the substrate. In this case, the refractive index ns of the low-refractive index layer 3 is considered as the refractive index on the substrate side. A diamine only having the trans-1,4-cyclohexylene group may be used in combination with 90% by mole or less of another diamine within the refractive index range described above.

The amount of the third diamine may be 50% by mole or less of the total amount of diamine represented by the general formula (3) and/or diamine represented by the general formula (12) and the third diamine used in the reaction described above. The amount of the third diamine larger than 50% by mole may result in low transparency or an excessively high refractive index.

A method for manufacturing an optical member according to an embodiment of the present invention is a method for manufacturing an optical member including a laminated body that can reduce the reflection of light formed on a substrate surface. This method includes 1) purifying a diamine represented by the following general formula (3) such that a 1,4-cyclohexylene group in the main chain of $R_2$ in the general formula (3) contains 90% by mole or more of a trans-1,4-cyclohexylene group,

[Chem. 18]

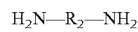 (3)

wherein $R_2$ denotes a divalent organic group having one or two or more 1,4-cyclohexylene groups in the main chain, 2) producing a polyimide containing a repeating unit represented by the following general formula (1) by the reaction of the purified diamine with an acid dianhydride represented by the following general formula (4) in a solvent,

[Chem. 19]

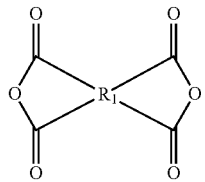

(4)

wherein $R_1$ denotes a tetravalent organic group,

[Chem. 20]

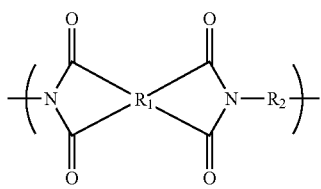

(1)

wherein $R_1$ and $R_2$ are as described above, 3) applying a solution containing the polyimide to the substrate or a thin film formed on the substrate, and 4) drying and/or firing the applied solution containing the polyimide at 100° C. or more and 250° C. or less to form a polyimide layer.

The method for manufacturing an optical member according to an embodiment of the present invention may further include 5) applying a precursor sol of aluminum oxide to the outermost surface of the laminated body, 6) drying and/or firing the applied precursor sol of aluminum oxide at 100° C. or more and 250° C. or less to form an aluminum oxide film, and 7) immersing the aluminum oxide film in hot water to form a textured structure formed of plate crystals mainly composed of aluminum oxide.

A method for producing a polyimide according to an embodiment of the present invention will be described below.

In the synthesis of a polyimide, a diamine having one or two or more 1,4-cyclohexylene groups represented by the general formula (3) is purified by the method described above to produce a diamine in which most of the 1,4-cyclohexylene group has the trans form. The resulting diamine is reacted with an acid dianhydride represented by the general formula (4) in a solvent to produce a polyamic acid solution. In addition to the diamine in which most of the 1,4-cyclohexylene group has the trans form, a diamine represented by the general formula (12) and/or the third diamine, such as an aromatic diamine, may also be reacted with an acid dianhydride represented by the general formula (4) in a solvent to produce a polyamic acid solution. The imidization of the resulting polyamic acid in a solution yields a polyimide. The polyimide may be isolated by removing the solvent.

The ratio of the amount of acid dianhydride represented by the general formula (4) to the amount of diamine used in the reaction described above can be 0.94 or more and 1.06 or less (mol/mol).

The solvent for use in the synthesis of the polyimide may be any solvent that can dissolve the polyamic acid and the polyimide, for example, an aprotic polar solvent, such as N,N-dimethylformamide, N,N-dimethylacetamide, or N-methyl-2-pyrrolidone.

The imidization converts the polyamic acid into the polyimide by cyclodehydration. The imidization may be performed by heating at 25° C. or more and 120° C. or less in the presence of a tertiary amine, such as pyridine or triethylamine, and acetic anhydride or by azeotrope with xylene at 150° C. or more.

After the polyimide synthesis, the polyimide solution may be directly used in the latter process. Alternatively, the polyimide solution may be poured into a poor solvent to precipitate a polyimide powder, which is filtered off, dried, and dissolved in a solvent again. In the latter case, precipitation in an alcohol can remove unreacted monomers and various chemicals used in the imidization. The polyimide solution or the isolated polyimide powder may be dried at 50° C. or more and 150° C. or less in the atmosphere or under reduced pressure to remove the solvent.

The imidization rate of the polyimide is preferably 90% or more, more preferably 93% or more and 99% or less. The imidization rate lower than 90% tends to result in an increase in the water absorption rate of the polyimide, causing variations in film thickness or refractive index.

A polyimide soluble in organic solvents according to an embodiment of the present invention may be dissolved again in an organic solvent before use. Examples of the organic solvent include, but are not limited to, ketones, such as 2-butanone, methyl isobutyl ketone, cyclopentanone, and cyclohexanone; esters, such as ethyl acetate, n-butyl acetate, ethylene glycol monomethyl ether acetate, propylene glycol monomethyl ether acetate, ethyl lactate, and γ-butyrolactone; ethers, such as tetrahydrofuran, dioxane, diisopropyl ether, dibutyl ether, cyclopentyl methyl ether, and diglyme; aromatic hydrocarbons, such as toluene, xylene, and ethylbenzene; chlorinated hydrocarbons, such as chloroform, methylene chloride, and tetrachloroethane; and others, such as N-methylpyrrolidone, N,N-dimethylformamide, N,N-dimethylacetamide, dimethyl sulfoxide, and sulfolane.

In particular, a polyimide soluble in organic solvents according to an embodiment of the present invention may be dissolved in at least two solvents selected from N,N-dimethylacetamide, cyclopentanone, cyclohexanone, propylene glycol monomethyl ether acetate, ethyl lactate, and γ-butyrolactone at a concentration of 5% by weight or more.

It is desirable that a repeating unit having the trans-1,4-cyclohexylene group in the repeating unit represented by the general formula (1) in a polyimide according to an embodiment of the present invention be 25% by mole or more and 90% by mole or less, preferably 30% by mole or more and 95% by mole or less, of all the repeating units of the polyimide. At less than 25% by mole, the refractive index cannot be reduced without lowering the Tg of the polyimide. At more than 90% by mole, an organosiloxane group cannot be sufficiently introduced.

It is desirable that a repeating unit having an organosiloxane group represented by the general formula (5) in a polyimide according to an embodiment of the present invention be 5% by mole or more and 50% by mole or less, preferably 10% by mole or more and 40% by mole or less, of all the repeating units of the polyimide. Within these ranges, the refractive index and the optical dispersion of the polyimide can be markedly reduced, and the solubility of the polyimide in organic solvents can be improved.

A method for forming a polyimide layer 2 according to an embodiment of the present invention will be described below.

In the formation of the polyimide layer 2 using a polyimide synthesized as described above, a solution containing the synthesized polyimide is applied to a substrate or a thin film formed on the substrate and is dried or fired at 100° C. or more and 250° C. or less.

A polyimide solution produced in the polyimide synthesis may be directly used in the formation of the polyimide layer 2. Alternatively, the polyimide solution may be poured into a poor solvent to precipitate a polyimide powder, which is filtered off, dried, and dissolved in a solvent again. In the latter case, reprecipitation in an alcohol can remove unreacted monomers and various chemicals used in the imidization.

Examples of the solvent in which the precipitated polyimide powder is to be dissolved include, but are not limited to, ketones, such as 2-butanone, methyl isobutyl ketone, cyclopentanone, and cyclohexanone; esters, such as ethyl acetate, n-butyl acetate, ethylene glycol monomethyl ether acetate, propylene glycol monomethyl ether acetate, ethyl lactate, and γ-butyrolactone; ethers, such as tetrahydrofuran, dioxane, diisopropyl ether, dibutyl ether, cyclopentyl methyl ether, and diglyme; aromatic hydrocarbons, such as toluene, xylene, and ethylbenzene; chlorinated hydrocarbons, such as chloroform, methylene chloride, and tetrachloroethane; and others, such as N-methylpyrrolidone, N,N-dimethylformamide, N,N-dimethylacetamide, dimethyl sulfoxide, and sulfolane. Furthermore, alcohols, such as 1-butanol, methyl cellosolve, and methoxypropanol may also be used.

It is desirable that the polyimide be soluble in organic solvents.

The polyimide solution can be applied by a known method, such as dipping, spin coating, spraying, printing, or flow coating, or a combination thereof.

The drying and/or firing of the polyimide solution is principally performed to remove the solvent. The polyimide solution can be heated for approximately five minutes to two hours. The polyimide solution may be heated by light, radiation, or electromagnetic wave irradiation using a circulating hot-air oven, a muffle furnace, infrared rays, or a microwave.

It is desirable that the polyimide content of a polyimide layer according to an embodiment of the present invention be 70% by weight or more, preferably 80% by weight or more and 100% by weight or less.

The polyimide layer 2 may contain a component other than the polyimide provided that the component does not impair the optical properties, transparency, heat resistance, and water-fastness of the polyimide. The amount of component other than the polyimide is less than 20 parts by weight per 100 parts by weight of the polyimide. Twenty parts by weight or more of the component other than the polyimide may impair the transparency, the film strength, and the film thickness uniformity of the polyimide.

Examples of the component other than the polyimide include, but are not limited to, silane coupling agents and phosphates for improving adhesion; thermosetting resins, photocurable resins, and cross-linkers, such as epoxy resin, melamine resin, and acrylic resin, for improving the solvent resistance of the polyimide layer 2; and small amounts of inorganic fine particles, such as $SiO_2$, $TiO_2$, $ZrO_2$, $SiO_2$, $ZnO$, $MgO$, and $Al_2O_3$, for controlling the refractive index or the film hardness of the polyimide. It is desirable that the amount of component other than the polyimide be 30% by weight or less, preferably 0% by weight or more and 20% by weight or less.

The low-refractive index layer 3 formed on the polyimide layer 2 may have a refractive index of 1.4 or less and may be composed of a metal oxide, a metal halide, or a fluoropolymer. The low-refractive index layer 3 formed of a porous layer mainly composed of silicon oxide, magnesium fluoride, or a fluorinated acrylic polymer or a layer having a fine textured structure mainly composed of silicon oxide, aluminum oxide, or a transparent polymer can have a higher antireflection effect.

An optical member according to an embodiment of the present invention may have a textured structure on the outermost surface of the laminated body. The textured structure may be formed of plate crystals mainly composed of aluminum oxide.

Figure 2:
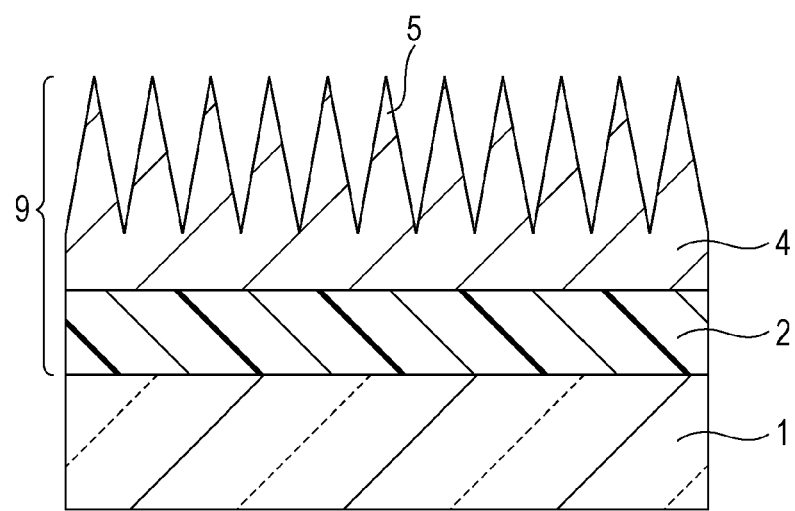
FIG. 2 is a schematic view of an optical member according to another embodiment of the present invention.

FIG. 2 is a schematic view of an optical member according to another embodiment of the present invention. In FIG. 2, the optical member according to this embodiment of the present invention includes a polyimide layer 2 and a layer 4 having a fine textured structure, on a surface of a substrate 1 in this order. The outermost surface has a fine textured structure 5.

The fine textured structure 5 of the layer 4 having a fine textured structure in a laminated body 9 can be formed of plate crystals of aluminum oxide. The plate crystals of aluminum oxide refer to plate crystals deposited and grown on a surface layer of a film mainly composed of aluminum oxide by immersing the film into hot water to peptize the surface layer.

Figure 3:
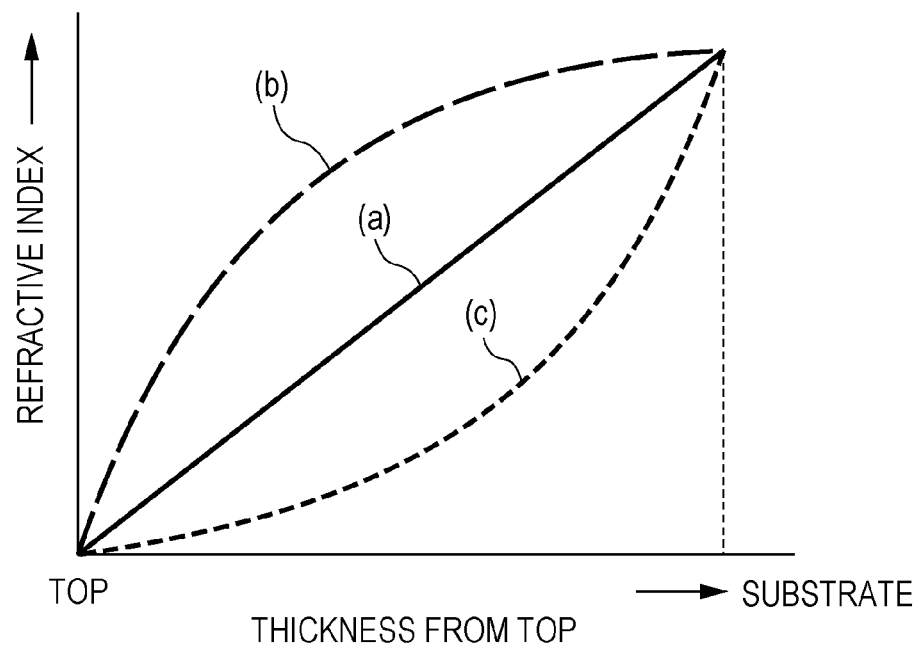
FIG. 3 is a graph illustrating the refractive index distribution of an optical member according to an embodiment of the present invention.

As illustrated in FIG. 3, the refractive index of the layer 4 having a fine textured structure may continuously increase from the top toward the substrate in a linear (a) or curved (b or c) manner. The layer 4 having a refractive index that continuously increases from the top toward the substrate has a higher reflectance-reduction effect than a plurality of layers in which the refractive index increases layer by layer from the top.

The fine textured structure is formed of crystals mainly composed of an oxide of aluminum, a hydrate of an oxide of aluminum, or a hydroxide of aluminum. The textured structure is preferably formed of crystals containing 70% by mole or more, more preferably 90% by mole or more, of an oxide of aluminum, a hydrate of an oxide of aluminum, or a hydroxide of aluminum. These crystals are herein referred to as plate crystals. In particular, the plate crystals can be formed of boehmite. Since the textured structure 5 having fine ridges is formed of plate crystals, the plate crystals are disposed at a particular angle with respect to the substrate surface to increase the height and reduce the intervals of the fine ridges. An oxide of aluminum, a hydroxide of aluminum, and hydrates of these compounds are herein collectively referred to as aluminum oxide. One or more oxide layers formed of aluminum oxide alone or 70% by mole or more, preferably 90% by mole or more, of aluminum oxide and $ZrO_2$, $SiO_2$, $TiO_2$, $ZnO$, or $MgO$ are hereinafter referred to as a layer mainly composed of aluminum oxide.

Figure 4:
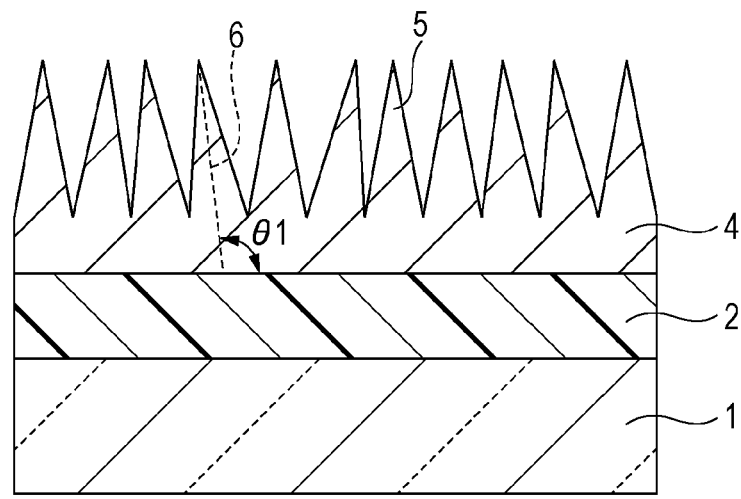
FIG. 4 is a schematic view of an optical member according to an embodiment of the present invention.

In FIG. 4, a substrate 1, such as a plate, a film, or a sheet, has a flat surface. It is desirable that plate crystals be disposed such that the average of the angles θ1 between the slopes 6 of the plate crystals and the substrate surface is 45° or more and 90° or less, preferably 60° or more and 90° or less.

Figure 5:
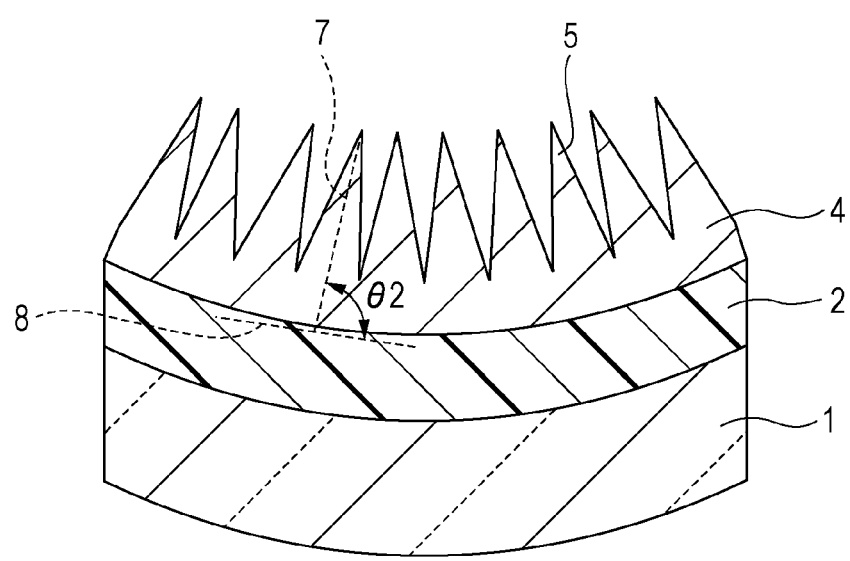
FIG. 5 is a schematic view of an optical member according to an embodiment of the present invention.

In FIG. 5, a substrate 1 has a two-dimensionally or three-dimensionally curved surface. It is desirable that plate crystals be disposed such that the average of the angles θ2 between the slopes 7 of the plate crystals and the tangent line 8 of the substrate surface is 45° or more and 90° or less, preferably 60° or more and 90° or less. If the angles θ1 and θ2 are more than 90°, their supplementary angles are considered as the angles θ1 and θ2.

The thickness of the layer 4 having a fine textured structure is preferably 20 nm or more and 1000 nm or less, more preferably 50 nm or more and 1000 nm or less. The thickness of the layer 4 having a fine textured structure in the range of 20 to 1000 nm results in effective antireflection performance of the fine textured structure, eliminates the possibility of reduction in the mechanical strength of the fine ridges, and provides advantages in the manufacturing costs of the fine textured structure. The thickness of the layer 4 having a fine textured structure in the range of 50 to 1000 nm can further improve antireflection performance.

The surface density of the fine ridges is also important and can be represented by the average surface roughness Ra' and the surface area ratio Sr, which is defined later. The average surface roughness Ra' can be determined by applying the measurement of center-line average roughness to the surface. The average surface roughness Ra' is 5 nm or more, preferably 10 nm or more, more preferably 15 nm or more and 100 nm or less. The surface area ratio Sr is 1.1 or more, preferably 1.15 or more, more preferably 1.2 or more and 3.5 or less.

One of methods for evaluating the fine textured structure is the observation of the fine textured surface with a scanning probe microscope. The average surface roughness Ra' and the surface area ratio Sr can be determined through this observation. As mentioned above, the average surface roughness Ra' (nm) can be determined by three-dimensionally applying the measurement of center-line average roughness Ra defined in JIS B 0601 to a surface to be measured. The average surface roughness Ra' refers to "the average of the absolute values of deviations of specified planes from the reference plane" and is expressed by the following equation (1):

[Math. 1]

$$Ra' = \frac{1}{S_0} \int_{Y_B}^{Y_T} \int_{X_L}^{X_R} |F(X, Y) - Z_0| d_X d_Y \quad (1)$$

wherein

Ra': average surface roughness (nm);

$S_0$: the area of a surface to be measured, on the assumption that the surface is flat, $|XR-X_L| \times |Y_T-Y_B|$;

F(X,Y): a height at a point of measurement (X,Y), wherein X denotes the x-coordinate, and Y denotes the y-coordinate;

$X_L$ to $X_R$: the range of the surface to be measured on the x-coordinate;

$Y_B$ to $Y_T$: the range of the surface to be measured on the y-coordinate; and $Z_0$: the average height of the surface to be measured.

The surface area ratio Sr can be determined by $Sr=S/S_0$ wherein $S_0$ denotes the area of a surface to be measured, on the assumption that the surface is flat, and S denotes the actual surface area of the surface to be measured. The actual surface area of the surface to be measured is determined as described below. First, the surface to be measured is divided into minute triangles defined by adjacent three data points (A, B, and C). The area ΔS of each of the minute triangles is then determined utilizing a vector product. ΔS(ΔABC)=[s(s−AB)(s−BC)(s−AC)]0.5, wherein AB, BC, and AC denote the lengths of their respective sides. s=0.5 (AB+BC+AC)]. The surface area S is the sum total of ΔS's. When the surface density of the fine ridges is such that Ra' is 5 nm or more and Sr is 1.1 or more, the textured structure can exhibit antireflection. Ra' of 10 nm or more and Sr of 1.15 or more result in a higher antireflection effect. When Ra' is 15 nm or more and Sr is 1.2 or more, the fine textured structure is actually useful. When Ra' is 100 nm or more and Sr is 3.5 or more, however, scattering due to the textured structure predominates over the antireflection effect, resulting in poor antireflection performance.

In the case that the layer 4 having a fine textured structure is mainly composed of aluminum oxide, a metal film made of metallic Al alone or a metal film made of metallic Al and metallic Zn or metallic Mg is formed on the polyimide layer 2. Immersion in hot water at 50° C. or more or exposure to water vapor forms the textured structure 5 on the metal surface by hydration, dissolution, and reprecipitation. Likewise, hot-water immersion or water vapor exposure of a layer mainly composed of aluminum oxide formed on a layer 2 mainly composed of organic resin can also precipitate the fine textured structure 5 on the surface. The layer mainly composed of aluminum oxide can be formed by a known gas phase method, such as chemical vapor deposition (CVD) or physical vapor deposition (PVD), a known liquid phase method, such as a sol-gel method, or a known hydrothermal synthesis using an inorganic salt. In such a method involving the formation of plate crystals of aluminum oxide, an amorphous aluminum oxide layer may remain under the textured structure 5 in the layer 4 having a fine textured structure.

A gel film formed by the application of a sol-gel coating liquid containing aluminum oxide can be treated with hot water to grow alumina plate crystals. This method can form a uniform antireflection layer on a large-area or nonplanar substrate.

The raw material of the gel film formed by the application of a sol-gel coating liquid containing aluminum oxide contains an Al compound alone or an Al compound and at least one compound selected from Zr, Si, Ti, Zn, and Mg compounds. Metal alkoxides and salt compounds, such as chlorides and nitrates, may be used as the raw materials for $Al_2O_3$, $ZrO_2$, $SiO_2$, $TiO_2$, ZnO, and MgO. In particular, metal alkoxides may be used as $ZrO_2$, $SiO_2$, and $TiO_2$ raw materials because of their excellent film-forming properties.

Examples of the aluminum compound include, but are not limited to, aluminum ethoxide, aluminum isopropoxide, aluminum-n-butoxide, aluminum-sec-butoxide, aluminum-tert-butoxide, and aluminum acetylacetonate, oligomers thereof, aluminum nitrate, aluminum chloride, aluminum acetate, aluminum phosphate, aluminum sulfate, and aluminum hydroxide.

Specific examples of the zirconium alkoxide include, but are not limited to, zirconium tetraethoxide, zirconium tetraethoxide, zirconium tetra-n-propoxide, zirconium tetraisopropoxide, zirconium tetra-n-butoxide, and zirconium tetra-t-butoxide.

The silicon alkoxide may be represented by the general formula $Si(OR)_4$. R's may be the same or different lower alkyl groups, such as a methyl group, an ethyl group, a propyl group, an isopropyl group, a butyl group, and an isobutyl group.

Examples of the titanium alkoxide include, but are not limited to, tetramethoxytitanium, tetraethoxytitanium, tetra-n-propoxytitanium, tetraisopropoxytitanium, tetra-n-butoxytitanium, and tetraisobutoxytitanium.

Examples of the zinc compound include, but are not limited to, zinc acetate, zinc chloride, zinc nitrate, zinc stearate, zinc oleate, and zinc salicylate, particularly zinc acetate and zinc chloride.

Examples of the magnesium compound include, but are not limited to, magnesium alkoxides, such as dimethoxymagnesium, diethoxymagnesium, dipropoxymagnesium, and dibutoxymagnesium, magnesium acetylacetonate, and magnesium chloride.

The organic solvent may be any organic solvent that does not induce the gelation of the raw materials described above, such as alkoxides. Examples of the organic solvent include, but are not limited to, alcohols, such as methanol, ethanol, 2-propanol, butanol, pentanol, ethylene glycol, and ethylene glycol-mono-n-propyl ether; aliphatic or alicyclic hydrocarbons, such as n-hexane, n-octane, cyclohexane, cyclopentane, and cyclooctane; aromatic hydrocarbons, such as toluene, xylene, and ethylbenzene; esters, such as ethyl formate, ethyl acetate, n-butyl acetate, ethylene glycol monomethyl ether acetate, ethylene glycol monoethyl ether acetate, and ethylene glycol monobutyl ether acetate; ketones, such as acetone, methyl ethyl ketone, methyl isobutyl ketone, and cyclohexanone; ethers, such as dimethoxyethane, tetrahydrofuran, dioxane, and diisopropyl ether; chlorinated hydrocarbons, such as chloroform, methylene chloride, carbon tetrachloride, and tetrachloroethane; and aprotic polar solvents, such as N-methylpyrrolidone, dimethylformamide, dimethylacetamide, and ethylene carbonate. Among the solvents described above, alcohols can provide particularly excellent solution stability.

Among the alkoxide raw materials, aluminum, zirconium, and titanium alkoxides have particularly high reactivity to water and are abruptly hydrolyzed by the action of moisture in the air or the addition of water, producing turbidity and precipitation in the solution. Aluminum salt compounds, zinc salt compounds, and magnesium salt compounds are difficult to dissolve in organic solvents and provide low solution stability. To avoid these problems, a stabilizer may be added to stabilize the solution.

Examples of the stabilizer include, but are not limited to, β-diketone compounds, such as acetylacetone, dipivaloylmethane, trifluoroacetylacetone, hexafluoroacetylacetone, benzoylacetone, and dibenzoylmethane; β-ketoester compounds, such as methyl acetoacetate, ethyl acetoacetate, allyl acetoacetate, benzyl acetoacetate, iso-propyl acetoacetate, tert-butyl acetoacetate, iso-butyl acetoacetate, 2-methoxyethyl acetoacetate, and 3-keto-methyl-n-valerate; and alkanolamines, such as monoethanolamine, diethanolamine, and triethanolamine. The molar ratio of the stabilizer to alkoxide or a salt compound can be approximately one. After the addition of the stabilizer, a catalyst can be added to promote part of reactions to form a desired precursor. Examples of the catalyst include, but are not limited to, nitric acid, hydrochloric acid, sulfuric acid, phosphoric acid, acetic acid, and ammonia. Examples of a method for applying the sol-gel coating liquid to form a film include, but are not limited to, known methods, such as dipping, spin coating, spraying, printing, and flow coating, and combinations of these methods.

The application of the sol-gel coating liquid is preferably followed by heat treatment at 100° C. or more and 230° C. or less, more preferably 120° C. or more and 200° C. or less. Although a higher heat-treatment temperature results in a greater density of the film, a heat-treatment temperature higher than 230° C. may cause damage, such as deformation, to the substrate. The heating time depends on the heating temperature and may be 10 minutes or more.

The gel film after drying or heat-treatment is immersed in hot water to precipitate plate crystals mainly composed of aluminum oxide, forming fine ridges on the outermost surface. Immersion in hot water peptizes the surface layer of the gel film containing aluminum oxide and elutes part of the components of the gel film. Owing to difference in hot-water solubility between hydroxides, plate crystals mainly composed of aluminum oxide are deposited and grown on the surface layer of the gel film. The temperature of hot water can range from 40° C. to 100° C. The hot-water treatment time may range from approximately 5 minutes to 24 hours.

In the hot-water treatment of a gel film containing aluminum oxide as the main component and an oxide, such as $TiO_2$, $ZrO_2$, $SiO_2$, $ZnO$, or $MgO$, as a different component, crystallization is related to difference in hot-water solubility between the components. Unlike the hot-water treatment of a film formed of aluminum oxide alone, therefore, the ratios of the inorganic components can be altered to control the size of plate crystals. This allows the shape of fine ridges formed of the plate crystals to be widely controlled within the range described above. Use of ZnO as an accessory component allows eutectic crystallization with aluminum oxide. This allows further wide control of refractive index, thereby achieving excellent antireflection performance.

Examples of the material of the substrate 1 include, but are not limited to, glass, resin, glass mirrors, and resin mirrors. Representative examples of the resin substrate include, but are not limited to, films and formed products made of thermoplastic resins, such as polyester, cellulose triacetate, cellulose acetate, poly(ethylene terephthalate), polypropylene, polystyrene, polycarbonate, polysulfone, polyacrylate, polymethacrylate, ABS resin, poly(phenylene oxide), polyurethane, polyethylene, polycycloolefin, and poly(vinyl chloride); and cross-linked films and cross-linked formed products made of various thermosetting resins, such as unsaturated polyester resin, phenolic resin, cross-linking polyurethane, cross-linking acrylic resin, and cross-linking saturated polyester resin. Specific examples of the glass include, but are not limited to, non-alkali glass and aluminosilicate glass. A substrate for use in the present invention may be any substrate, such as a plate, a film, or a sheet, that can have a shape for each intended use and may be a substrate having a two- or three-dimensionally curved surface. The thickness of the substrate is generally, but is not limited to, 5 mm or less.

An optical transparent member according to an embodiment of the present invention may further include another functional layer. For example, a hard coat layer may be disposed on the layer having a fine textured structure to improve the film hardness. A water repellent layer, for example, formed of fluoroalkylsilane or alkylsilane may be formed to prevent the adhesion of dirt. An adhesive layer or a primer layer may be formed to improve the adhesion between the substrate and the polyimide layer.

EXAMPLES

The present invention will be further described in the following examples. However, the present invention is not limited to these examples. Optical films having fine ridges prepared in examples and comparative examples were evaluated as described below.

(1) Purification of 4,4'-methylenebis(aminocyclohexane)

Hexane was gradually added under reflux to 200 g of 4,4'-methylenebis(aminocyclohexane) (hereinafter referred to as DADCM, manufactured by Tokyo Chemical Industry Co., Ltd.). 4,4'-methylenebis(aminocyclohexane) was completely dissolved in hexane. After heating was completed, the solution was left to stand for several (two to four) days at room temperature (20° C. to 25° C.). A precipitate was filtered off and dried under vacuum to yield 61 g of white purified DADCM in a solid state. $^1$H-NMR spectrum showed that the DADCM contained 95% by mole of trans-1,4-cyclohexylene group.

$^1$H-NMR (DMSO-$d_6$); δ0.83 (2H, m), δ0.97 (2H, q), δ1.18 (2H, m), δ1.60 (2H, d), δ1.69 (2H, d), δ2.05 (2H, s), δ2.42 (2H, m), δ3.30 (4H, b)

(2) Synthesis of Polyimides 1 to 8

A total of 0.012 mol of diamine (1) (purified DADCM or crude DADCM), diamine (2), and diamine (3) were dissolved in N,N-dimethylacetamide (hereinafter referred to as DMAc). 0.012 mol of acid dianhydride was added to the diamine solution while the diamine solution was cooled with water. DMAc was used in such an amount that the total mass of the diamines and the acid dianhydride was 20% by weight.

This solution was stirred at room temperature for 15 hours to cause polymerization reaction. After the solution was diluted with DMAc to 8% by weight, 7.4 ml of pyridine and 3.8 ml of acetic anhydride were added. The solution was stirred at room temperature for one hour. The solution was stirred in an oil bath at a temperature in the range of 60° C. to 70° C. for four hours. The polymerization solution was poured into methanol or a methanol/water mixed solvent for reprecipitation. A polymer thus reprecipitated was removed and was washed several times in methanol or a methanol/water mixed solvent. The polymer was dried under vacuum at 100° C. to yield a white to light yellow polyimide powder. The imidization rate was determined by measuring the residual amount of carboxy group from a $^1$H-NMR spectrum. Table 1 shows the compositions of polyimides 1 to 8.

TABLE 1

| Polyimide | Acid dianhydride | Diamine (1) | Trans-1,4-cyclohexylene content (% by mole) | Diamine (2) | Diamine (3) | Yield % | Imidization rate % |
|---|---|---|---|---|---|---|---|
| Polyimide 1 | TDA(1.0) | Purified DADCM(0.9) | 95 | PAM-E(0.1) | — | 92 | 96 |
| Polyimide 2 | TDA(1.0) | Crude DADCM(0.9) | 47 | PAM-E(0.1) | — | 90 | 95 |
| Polyimide 3 | TDA(1.0) | Purified DADCM(0.6) | 95 | BAPB(0.3) | PAM-E(0.1) | 94 | 98 |
| Polyimide 4 | TDA(1.0) | Crude DADCM(0.6) | 47 | BAPB(0.3) | PAM-E(0.1) | 93 | 98 |
| Polyimide 5 | BDA(1.0) | Purified DADCM(0.9) | 95 | PAM-E(0.1) | — | 85 | 95 |
| Polyimide 6 | BDA(1.0) | Crude DADCM(0.9) | 47 | PAM-E(0.1) | — | 81 | 95 |
| Polyimide 7 | 6FDA(1.0) | Purified DADCM(0.9) | 95 | PAM-E(0.1) | — | 89 | 96 |
| Polyimide 8 | 6FDA(1.0) | Crude DADCM(0.9) | 47 | PAM-E(0.1) | — | 89 | 95 |

(Note 1)
TDA: 4-(2,5-dioxotetrahydrofuran-3-yl)-1,2,3,4-tetrahydronaphthalene-1,2-dicarboxylic anhydride BDA: meso-butane-1,2,3,4-tetracarboxylic acid dianhydride DADCM: 4,4'-methylenebis(aminocyclohexane) PAM-E: dimethylsiloxane oligomer in which both ends were modified with amine BAPB: 4,4'-bis(4-aminophenoxy)biphenyl 6FDA: 4,4'-(hexafluoroisopropylidene)diphthalic acid anhydride
(Note 2)
Values in parentheses for acid dianhydride and diamines represent the molar ratio of these compounds charged.
(Note 3)
The trans-1,4-cyclohexylene group in the purified 4,4'-methylenebis(aminocyclohexane) accounted for 95% by mole of the 1,4-cyclohexylene group in the purified 4,4'-methylenebis(aminocyclohexane).

(3) Preparation of Polyimide Solutions 1 to 9 and 11 to 13

2.0 to 4.0 g of a powder of each of the polyimides 1 to 8 was dissolved in 96 to 98 g of a cyclopentanone/cyclohexanone mixed solvent to prepare polyimide solutions 1 to 9 and 11 to 13.

(4) Preparation of Polyimide Solutions 10 and 14

2.0 g of a powder of polyimide 1 or 2 and 0.3 g of melamine resin (trade name: Nikalac MX-706, manufactured by Nippon Carbide Industries Co., Inc.) were dissolved in 997 g of a cyclopentanone/cyclohexanone mixed solvent to prepare polyimide solutions 10 and 14. Table 2 shows the polyimide solutions prepared.

TABLE 2

| Polyimide solution | Polyimide | Cross-linker | Solid content % |
|---|---|---|---|
| Polyimide solution 1 | Polyimide 1 | — | 2% |
| Polyimide solution 2 | Polyimide 1 | — | 3% |
| Polyimide solution 3 | Polyimide 1 | — | 4% |
| Polyimide solution 4 | Polyimide 2 | — | 2% |
| Polyimide solution 5 | Polyimide 2 | — | 3% |
| Polyimide solution 6 | Polyimide 2 | — | 4% |
| Polyimide solution 7 | Polyimide 3 | — | 2% |
| Polyimide solution 8 | Polyimide 5 | — | 2% |
| Polyimide solution 9 | Polyimide 7 | — | 2% |
| Polyimide solution 10 | Polyimide 1 | MX-706 | 2% |
| Polyimide solution 11 | Polyimide 4 | — | 2% |
| Polyimide solution 12 | Polyimide 6 | — | 2% |
| Polyimide solution 13 | Polyimide 8 | — | 2% |
| Polyimide solution 14 | Polyimide 2 | MX-706 | 2% |

(5) Preparation of Aluminum Oxide (Alumina ($Al_2O_3$)) Sol 22.2 g of $Al(O\text{-sec-Bu})_3$, 5.86 g of ethyl 3-oxobutanoate, and 4-methyl-2-pentanol were stirred until the mixture became homogeneous. 1.62 g of 0.01M diluted hydrochloric acid dissolved in a 4-methyl-2-pentanol/1-ethoxy-2-propanol mixed solvent was gradually added to the $Al(O\text{-sec-Bu})_3$ solution and was stirred for a short time. The solvent was finally adjusted so as to contain 49.3 g of 4-methyl-2-pentanol and 21.1 g of 1-ethoxy-2-propanol. The solution was stirred in an oil bath at 120° C. for another three hours or more to prepare a precursor sol of aluminum oxide.

(6) Cleaning of Substrate

Various glass substrates having a diameter of approximately 30 mm and a thickness of approximately 2 mm, both surfaces of each of which were polished, were ultrasonically cleaned with an alkaline detergent and isopropyl alcohol (IPA) and were dried in an oven.

(7) Measurement of Reflectance

Reflectance was measured with an absolute reflectometer (USPM-RU, manufactured by Olympus Co.) at a wavelength in the range of 400 to 700 nm at an incident angle of 0°.

(8) Measurement of Film Thickness and Refractive Index

The film thickness and the refractive index were measured with a spectroscopic ellipsometer (VASE, manufactured by J. A. Woollam Japan Co., Inc.) at a wavelength in the range of 380 to 800 nm.

(9) Observation of Substrate Surface

A substrate surface treated with Pd/Pt was observed with a field emission scanning electron microscope (FE-SEM) (S-4800, manufactured by Hitachi High-Technologies Co.) at an accelerating voltage of 2 kV.

Example 1

A polished and cleaned surface of glass A mainly composed of $La_2O_5$ and having an nd of 1.77 and a vd of 50 was spin-coated with a proper amount of polyimide solution 1, 2, or 3 at 3000 to 4000 rpm. The substrate was dried at 200° C. for 60 minutes to form a film made of the polyimide 1 synthesized from purified DADCM on the substrate.

Figure 6:
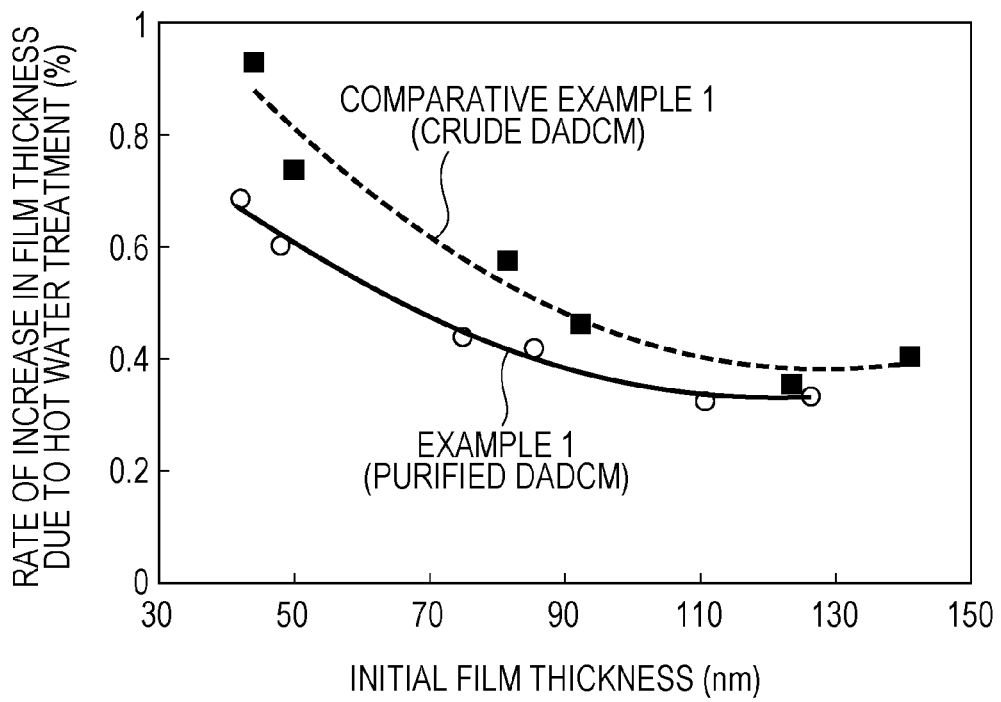
FIG. 6 is a graph showing the relationship between the thickness of a polyimide thin film and a rate of increase in film thickness due to the immersion of the film in hot water in Example 1 and Comparative Example 1.

The thickness and the refractive index of the film of the polyimide 1 were measured by ellipsometry. After the film of the polyimide 1 was immersed in hot water at 80° C. for 20 minutes, the thickness and the refractive index of the film were measured again. FIG. 6 shows the rate of increase in film thickness due to the immersion in hot water as a function of the initial film thickness. The rate of increase in film thickness due to the hot-water treatment of the film having an initial thickness of 100 nm or more ranged from 0.32% to 0.34%. The rate of increase in film thickness due to the hot-water treatment of the film having an initial thickness in the range of 40 to 50 nm ranged from 0.6% to 0.69%.

Comparative Example 1

The same procedures as Example 1 were performed except that the polyimide solutions 1, 2, and 3 were replaced with the polyimide solutions 4, 5, and 6 and that a layer was formed of the polyimide 2 synthesized from crude DADCM.

FIG. 6 shows the rate of increase in film thickness due to immersion in hot water as a function of the initial film thickness. The rate of increase in film thickness due to the hot-water treatment of the film having an initial thickness of 100 nm or more ranged from 0.36% to 0.4%. The rate of increase in film thickness due to the hot-water treatment of the film having an initial thickness in the range of 40 to 50 nm ranged from 0.74% to 0.93%. Thus, the rate of increase in film thickness due to moisture absorption during the hot-water treatment was higher than that of the film of the polyimide 1.

Examples 2 to 5

A polished and cleaned surface of glass A mainly composed of $La_2O_5$ and having an nd of 1.77 and a vd of 50 was spin-coated with a proper amount of polyimide solution 7, 8, 9, or 10 at 3000 to 4000 rpm. The substrate was dried at 200° C. for 60 minutes to form a film made of the polyimide 3, 5, or 7 synthesized from purified DADCM or a film made of the polyimide 1 and a cross-linker on the substrate.

The thickness and the refractive index of each of the polyimide films were measured by ellipsometry. After the polyimide films were immersed in hot water at 80° C. for 20 minutes, the thickness and the refractive index of each of the films were measured again. Table 3 shows the rate of increase in film thickness due to the immersion in hot water relative to the initial film thickness.

Comparative Examples 2 to 5

The same procedures as Examples 2 to 5 were performed except that the polyimide solutions 7 to 10 were replaced with the polyimide solutions 11 to 14 and that a film was formed of the polyimide 4, 6, or 8 synthesized from crude DADCM or the polyimide 2 and a cross-linker.

Table 3 shows the rate of increase in film thickness due to immersion in hot water relative to the initial film thickness. The rates of increase in film thickness due to hot-water treatment were higher than those of Examples 2 to 5.

TABLE 3

| | Polyimide | Cross-linker | Film thickness (nm) | Refractive index (550 nm) | Rate of increase in film thickness due to hot water treatment % |
|---|---|---|---|---|---|
| Example 1 | Polyimide 1 | — | 42 | 1.56 | 0.68 |
| Example 2 | Polyimide 3 | — | 43 | 1.60 | 0.50 |
| Example 3 | Polyimide 5 | — | 43 | 1.53 | 0.75 |
| Example 4 | Polyimide 7 | — | 43 | 1.55 | 0.55 |
| Example 5 | Polyimide 1 | MX-706 | 44 | 1.56 | 0.57 |
| Comparative example 1 | Polyimide 2 | — | 44 | 1.56 | 0.93 |
| Comparative example 2 | Polyimide 4 | — | 42 | 1.60 | 0.81 |
| Comparative example 3 | Polyimide 6 | — | 41 | 1.53 | 1.01 |
| Comparative example 4 | Polyimide 8 | — | 40 | 1.55 | 0.85 |
| Comparative example 5 | Polyimide 2 | MX-706 | 46 | 1.56 | 0.84 |

Examples 6 and 7

A polished and cleaned surface of glass A mainly composed of $La_2O_5$ and having an nd of 1.77 and a vd of 50 was spin-coated with a proper amount of polyimide solution 1 or 7 at 3000 to 4000 rpm. The substrate was dried at 200° C. for 60 minutes to form a film made of the polyimide 1 or 3 synthesized from purified DADCM on the substrate. The thickness and the refractive index of each of the polyimide films were measured by ellipsometry. After the polyimide films were left to stand at 60° C. and 90% RH for 250 hours, the thickness and the refractive index of each of the films were measured again. Table 4 shows the rate of increase in film thickness due to high temperature and high humidity relative to the initial film thickness.

Comparative Examples 6 and 7

The same procedures as Examples 6 and 7 were performed except that the polyimide solutions 1 and 7 were replaced with the polyimide solutions 4 and 11 and that a layer was formed of the polyimide 2 or 4 synthesized from crude DADCM.

Table 4 shows the rate of increase in film thickness due to high temperature and high humidity relative to the initial film thickness. The rates of increase in film thickness due to high temperature and high humidity were higher than those of Examples 6 and 7.

TABLE 4

| | Polyimide | Cross-linker | Film thickness (nm) | Refractive index (550 nm) | Rate of increase in film thickness due to hot water treatment % |
|---|---|---|---|---|---|
| Example 6 | Polyimide 1 | — | 43 | 1.56 | 2.60 |
| Example 7 | Polyimide 3 | — | 43 | 1.60 | 2.65 |

TABLE 4-continued

|  | Polyimide | Cross-linker | Film thickness (nm) | Refractive index (550 nm) | Rate of increase in film thickness due to hot water treatment % |
|---|---|---|---|---|---|
| Comparative example 6 | Polyimide 2 | — | 43 | 1.56 | 3.42 |
| Comparative example 7 | Polyimide 4 | — | 42 | 1.60 | 3.39 |

Example 8

A polished and cleaned surface of glass A mainly composed of $La_2O_5$ and having an nd of 1.77 and a vd of 50 was spin-coated with a proper amount of polyimide solution 1 at 3000 to 4000 rpm. The substrate was dried at 200° C. for 60 minutes to form a film made of the polyimide 1 synthesized from purified DADCM on the substrate.

The substrate on which the film of the polyimide 1 was formed was spin-coated with a proper amount of precursor sol of aluminum oxide at 4000 rpm for 20 seconds and was fired in a circulating hot-air oven at 200° C. for 120 minutes. Thus, the film of the polyimide 1 was coated with an amorphous aluminum oxide film. The substrate was then immersed in hot water at 80° C. for 20 minutes and was dried at 60° C. for 15 minutes.

The FE-SEM observation of the film surface showed the presence of fine ridges formed of random complicated plate crystals mainly composed of aluminum oxide.

Table 5 shows the absolute reflectance of the optical film on the glass A. The resulting antireflection-coated glass substrate had an absolute reflectance of 0.2% or less at a wavelength in the range of 450 to 650 nm. There was no detachment and crack observed.

Example 9

The same procedures as Example 8 were performed except that the glass A was replaced with glass B mainly composed of $TiO_2$ and having an nd of 1.78 and a vd of 26.

The absolute reflectance of the optical film on the glass B was measured. The resulting antireflection-coated glass substrate had an absolute reflectance of 0.2% or less at a wavelength in the range of 450 to 650 nm. There was no detachment and crack observed.

Comparative Example 8

The same procedures as Example 8 were performed except that the polyimide solutions 1 was replaced with the polyimide solution 4 and that a layer was formed of the polyimide 2 synthesized from crude DADCM.

Although there was no detachment and crack observed, the absolute reflectance of an optical film on glass A at a wavelength in the range of 450 to 650 nm varied between 0.2% and 0.3%.

Comparative Example 9

The same procedures as Example 9 were performed except that the polyimide solution 1 was replaced with the polyimide solution 4 and that a layer was formed of the polyimide 2 synthesized from crude DADCM.

The absolute reflectance of an optical film on glass B at a wavelength in the range of 450 to 650 nm varied between 0.2% and 0.3%. Furthermore, cracking was observed in a surrounding area.

TABLE 5

|  | Substrate | Polyimide | Cross-linker | Absolute reflectance (450~550 nm) | Observation on film |
|---|---|---|---|---|---|
| Example 8 | Glass A (nd = 1.77) | Polyimide 1 | — | <0.2% | Good |
| Example 9 | Glass B (nd = 1.78) | Polyimide 1 | — | <0.2% | Good |
| Comparative example 8 | Glass A (nd = 1.77) | Polyimide 2 | — | 0.2~0.3% | Uneven color |
| Comparative example 9 | Glass B (nd = 1.78) | Polyimide 2 | — | 0.2~0.3% | Crack |

Examples in which the solubility and the glass transition temperature of polyimides were measured will be described below.

(10) Purification of 4,4'-methylenebis(aminocyclohexane)

Hexane was gradually added under reflux to 200 g of 4,4'-methylenebis(aminocyclohexane) (hereinafter referred to as DADCM, manufactured by Tokyo Chemical Industry Co., Ltd.). 4,4'-methylenebis(aminocyclohexane) was completely dissolved in hexane. After heating was completed, the solution was left to stand in a refrigerator for several days. A precipitate was filtered off and dried under vacuum to yield 61 g of white purified DADCM in a solid state.

$^1$H-NMR (DMSO-$d_6$); $\delta 0.83$ (2H, m), $\delta 0.97$ (2H, q), $\delta 1.18$ (2H, m), $\delta 1.60$ (2H, d), $\delta 1.69$ (2H, d), $\delta 2.05$ (2H, s), $\delta 2.42$ (2H, m), $\delta 3.30$ (4H, b)

(11) DSC Measurement of 4,4'-methylenebis(aminocyclohexane)

Figure 7:
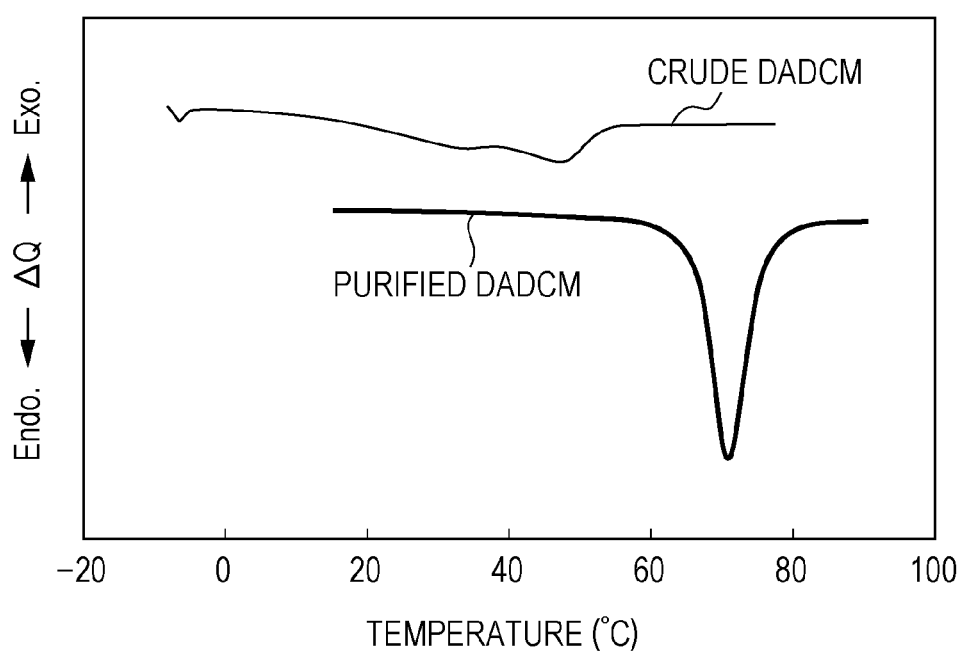
FIG. 7 is a graph showing DSC measurements of crude DADCM (4,4'-methylenebis(aminocyclohexane)) and purified DADCM in examples.

The melting points of crude DADCM and purified DADCM were measured with a differential scanning calorimeter (hereinafter referred to as a DSC, manufactured by Seiko Instruments Inc., trade name DSC 200) at a heating rate of 10° C./min. FIG. 7 shows the results. ΔQ denotes the amount of heat, Exo. denotes exothermic, and Endo. denotes endothermic.

(12) Gas Chromatography of 4,4'-methylenebis(aminocyclohexane)

The isomer contents of crude DADCM and purified DADCM were measured with a GC/MS system (manufactured by Agilent Technologies, trade name 6890N network GC) equipped with a GC column (manufactured by Agilent Technologies, trade name HP-35). Peaks assigned to a trans-trans isomer, a trans-cis isomer, and a cis-cis isomer were observed in ascending order of retention time. From the areas of these peaks, the trans content (% by mole) of the 1,4-cyclohexylene group was calculated by the following equation: Trans content=([trans-trans isomer peak area]+[trans-cis isomer peak area]/2)/[total peak area of three isomers].

(13) Synthesis of Polyimides 9 to 22

A total of 0.012 mol of diamine (1) (purified DADCM or crude DADCM), diamine (2), and diamine (3) (organosiloxane diamine) were dissolved in N,N-dimethylacetamide (hereinafter referred to as DMAc). 0.012 mol of acid dianhydride was added to the diamine solution while the diamine solution was cooled with water. DMAc was used in such an amount that the total mass of the diamines and the acid dianhydride was 20% by weight.

This solution was stirred at room temperature for 15 hours to cause polymerization reaction. After the solution was diluted with DMAc to 8% by weight, 7.4 ml of pyridine and 3.8 ml of acetic anhydride were added. The solution was stirred at room temperature for one hour. The solution was stirred in an oil bath at a temperature in the range of 60° C. to 70° C. for four hours. The polymerization solution was poured into methanol or a methanol/water mixed solvent for reprecipitation. A polymer thus reprecipitated was removed and was washed several times in methanol or a methanol/water mixed solvent. The polymer was dried under vacuum at 100° C. to yield a white to light yellow polyimide powder. The imidization rate was determined by measuring the residual amount of carboxy group from a $^1$H-NMR spectrum.

(14) Evaluation of Solubility 1.0 g of a powder of each of the polyimides 9 to 22 was added to 4 g each of five solvents: N,N-dimethylacetamide (hereinafter referred to as DMAc), N-methyl-2-pyrrolidone (hereinafter referred to as NMP), γ-butyrolactone, cyclopentanone, and cyclohexanone to examine solubility. Table 7

(16) Measurement of Refractive Index

A polished surface of glass A having an nd of 1.77 and a vd of 50 was spin-coated at 3000 to 4000 rpm with a proper amount of solution in which 4.0 g of a powder of each of the polyimides 9 to 22 was dissolved in 96 g of a cyclopentanone/cyclohexanone mixed solvent. The substrate was dried at 200° C. for 60 minutes to form a film of each of the polyimides 9 to 22 having a thickness of approximately 100 nm.

The refractive index of the polyimide film on the substrate was measured with a spectroscopic ellipsometer (VASE, manufactured by J. A. Woollam Japan Co., Inc.) at a wavelength in the range of 400 to 700 nm. Table 7 shows the refractive index (550 nm) and Abbe number (vd) obtained from the refractive index.

Examples 10 to 16

As shown in Table 6, the polyimides 9 to 15 were synthesized by the method described above using purified DADCM.

TABLE 6

| Example | Polyimide | Acid dianhydride | Diamine (1) | Trans-1,4-cyclohexylene content (% by mole) | Diamine (2) | Diamine (3) | Yield % | Imidization rate % | Powder properties |
|---|---|---|---|---|---|---|---|---|---|
| Example 10 | Polyimide 9 | TDA(1.0) | Purified DADCM(0.9) | 97 | PAM-E(0.1) | | 92 | 96 | White powder |
| Example 11 | Polyimide 10 | TDA(1.0) | Purified DADCM(0.6) | 97 | BAPB(0.3) | PAM-E(0.1) | 94 | 98 | White powder |
| Example 12 | Polyimide 11 | BDA(1.0) | Purified DADCM(0.9) | 97 | PAM-E(0.1) | | 85 | 95 | White powder |
| Example 13 | Polyimide 12 | BDA(1.0) | Purified DADCM(0.8) | 97 | PAM-E(0.2) | | 87 | 96 | White powder |
| Example 14 | Polyimide 13 | B4400(1.0) | Purified DADCM(0.9) | 97 | PAM-E(0.1) | | 85 | 95 | Light yellow powder |
| Example 15 | Polyimide 14 | 6FDA(1.0) | Purified DADCM(0.9) | 97 | PAM-E(0.1) | | 89 | 96 | White powder |
| Example 16 | Polyimide 15 | DSDA(1.0) | Purified DADCM(0.9) | 97 | PAM-E(0.1) | | 84 | 97 | Light yellow powder |
| Comparative example 10 | Polyimide 16 | TDA(1.0) | Crude DADCM(0.9) | 70 | PAM-E(0.1) | | 90 | 95 | Light yellow powder |
| Comparative example 11 | Polyimide 17 | TDA(1.0) | Crude DADCM(0.6) | 70 | BAPB(0.3) | PAM-E(0.1) | 93 | 98 | Light yellow powder |
| Comparative example 12 | Polyimide 18 | BDA(1.0) | Crude DADCM(0.9) | 70 | PAM-E(0.1) | | 81 | 95 | Yellow powder (sticky) |
| Comparative example 13 | Polyimide 19 | BDA(1.0) | Crude DADCM(0.8) | 70 | PAM-E(0.2) | | 85 | 95 | Yellow powder (sticky) |
| Comparative example 14 | Polyimide 20 | B4400(1.0) | Crude DADCM(0.9) | 70 | PAM-E(0.1) | | 84 | 96 | Yellow powder (sticky) |
| Comparative example 15 | Polyimide 21 | 6FDA(1.0) | Crude DADCM(0.9) | 70 | PAM-E(0.1) | | 89 | 95 | Yellow powder (sticky) |
| Comparative example 16 | Polyimide 22 | DSDA(1.0) | Crude DADCM(0.9) | 70 | PAM-E(0.1) | | 79 | 97 | Yellow powder |

(Note 1)
TDA: 4-(2,5-dioxotetrahydrofuran-3-yl)-1,2,3,4-tetrahydronaphthalene-1,2-dicarboxylic anhydride BDA: meso-butane-1,2,3,4-tetracarboxylic acid dianhydride DADCM: 4,4'-methylenebis(aminocyclohexane) PAM-E: dimethylsiloxane oligomer in which both ends were modified with amine BAPB: 4,4'-bis(4-aminophenoxy)biphenyl B4400: 5-(2,5-dioxotetrahydrofuryl)-3-methyl-3-cyclohexene-1,2-dicarboxylic anhydride 6FDA: 4,4'-(hexafluoroisopropylidene)diphthalic acid anhydride DSDA: 3,3',4,4'-diphenylsulfonetetracarboxylic acid dianhydride
(Note 2)
Values in parentheses for acid dianhydride and diamines represent the molar ratio of these compounds charged.
(Note 3)
The trans content (% by mole) represents the mole percentage of the trans-1,4-cyclohexylene group in the diamine 1 (DADCM).

shows the results, in which "Good" indicates soluble at room temperature, "Fair" indicates soluble by heating, and "Poor" indicates insoluble even by heating.

(15) Measurement of Glass Transition Temperature (Tg) of Polyimide

An aluminum pan filled with a polyimide powder was heated in the DSC from room temperature to 300° C. at 20° C./min to measure the glass transition temperature of the polyimide. Table 8 shows the results.

The purified DADCM used as a monomer was obtained by recrystallization of commercial DADCM. $^1$H-NMR spectrum and gas chromatography proved almost complete isolation of a trans-trans structural isomer. Table 6 shows the trans content measured by gas chromatography before and after purification. As illustrated in FIG. 7, the DSC measurement of purified DADCM also showed one endothermic peak at a temperature in the range of approximately 70° C. to 71° C. probably assigned to the melting of the trans-trans structural isomer.

The polyimides 9 to 15 synthesized were white to light yellow powders and were soluble in DMAc and NMP at room temperature and soluble in cyclopentanone, if necessary, by heating. Table 7 shows the results.

DSC measurement showed that crude DADCM had three broad endothermic peaks probably assigned to the melting of cis-cis, cis-trans, and trans-trans structural isomers.

TABLE 7

| | | Solubility | | | | |
|---|---|---|---|---|---|---|
| Example | Polyimide | DMAc | NMP | γ-butyrolactone | Cyclopentanone | Cyclohexanone |
| Example 10 | Polyimide 9 | Good | Good | Good | Good | Good |
| Example 11 | Polyimide 10 | Good | Good | Good | Good | Fair |
| Example 12 | Polyimide 11 | Good | Good | Poor | Fair | Fair |
| Example 13 | Polyimide 12 | Good | Good | Good | Good | Good |
| Example 14 | Polyimide 13 | Good | Good | Good | Good | Good |
| Example 15 | Polyimide 14 | Good | Good | Poor | Good | Fair |
| Example 16 | Polyimide 15 | Good | Good | Poor | Good | Fair |
| Comparative example 10 | Polyimide 16 | Good | Good | Good | Good | Good |
| Comparative example 11 | Polyimide 17 | Good | Good | Good | Good | Good |
| Comparative example 12 | Polyimide 18 | Good | Good | Fair | Fair | Fair |
| Comparative example 13 | Polyimide 19 | Good | Good | Good | Good | Good |
| Comparative example 14 | Polyimide 20 | Good | Good | Good | Good | Good |
| Comparative example 15 | Polyimide 21 | Good | Good | Fair | Good | Good |
| Comparative example 16 | Polyimide 22 | Good | Good | Poor | Good | Fair |

(Note 1)
DMAc: N,N-dimethylacetamide NMP: N-methyl-2-pyrrolidone

The DSC measurement of the polyimide clearly showed the presence of Tg. A polyimide produced using 0.1 molar equivalent of the organosiloxane diamine (PAM-E) had a Tg as high as 200° C. or more, which was comparable to the Tg of a polyimide produced by copolymerization with an aromatic diamine (BAPB). A polyimide produced using 0.2 molar equivalent of PAM-E had a Tg as high as 190° C.

The refractive index measurement showed that some of the polyimides had a low refractive index below 1.55 and a high Abbe number in the range of 27 to 45. The isolation of the trans form did not cause a change in refractive index or an increase in Abbe number. Table 8 shows the results.

The polyimides 9 to 15 synthesized in Examples 10 to 16 were white or light yellow powders, whereas the polyimides 16 to 22 synthesized in Comparative Examples 10 to 16 were light yellow or yellow polyimides. In particular, the polyimides 18 to 21 were yellow sticky polyimide powders. Although the polyimides 16 to 22 had solubility in γ-butyrolactone substantially equivalent to or higher than the solubility of the polyimides 9 to 15, the polyimides 16 to 22 had a 12° C. or more lower Tg than the polyimides 9 to 15. In particular, the polyimides 19 to 21 had broad and indistinct Tg's.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

TABLE 8

| Example | Polyimide | Tg/° C. | Refractive index | vd | Comparative example | Polyimide | Tg/° C. | Refractive index | vd |
|---|---|---|---|---|---|---|---|---|---|
| Example 10 | Polyimide 9 | 228 | 1.565 | 38 | Comparative example 10 | Polyimide 16 | 212 | 1.564 | 37 |
| Example 11 | Polyimide 10 | 227 | 1.61 | 28 | Comparative example 11 | Polyimide 17 | 215 | 1.610 | 28 |
| Example 12 | Polyimide 11 | 211 | 1.538 | 43 | Comparative example 12 | Polyimide 18 | 199 | 1.539 | 43 |
| Example 13 | Polyimide 12 | 190 | 1.525 | 45 | Comparative example 13 | Polyimide 19 | 150-170* | 1.525 | 45 |
| Example 14 | Polyimide 13 | 226 | 1.542 | 40 | Comparative example 14 | Polyimide 20 | 180-210* | 1.541 | 40 |
| Example 15 | Polyimide 14 | 220 | 1.557 | 27 | Comparative example 15 | Polyimide 21 | 180-200* | 1.557 | 28 |
| Example 16 | Polyimide 15 | 230 | 1.601 | 27 | Comparative example 16 | Polyimide 22 | 218 | 1.600 | 27 |

(Note 1)
*No distinct Tg was observed.

Comparative Examples 10 to 16

The same procedures as Examples 10 to 16 were performed except that polyimides 16 to 22 were synthesized using crude DADCM.

This application claims the benefit of Japanese Patent Application No. 2010-043332, filed Feb. 26, 2010, No. 2010-121000, filed May 26, 2010, and No. 2011-022042, filed Feb. 3, 2011, which are hereby incorporated by reference herein in their entirety.

INDUSTRIAL APPLICABILITY

Optical members according to embodiments of the present invention can be applied to transparent substrates having any refractive index, have an excellent antireflection effect on visible light, and excellent long-term weatherability. Thus, optical members according to embodiments of the present invention can be used in various displays for use in word processors, computers, television sets, plasma display panels, and the like; optical members, such as polarizers for liquid crystal displays, and sunglass lenses, prescription glass lenses, viewing lens for cameras, prisms, fly-eye lenses, toric lenses, various optical filters, and sensors made of various optical lens materials and transparent plastics; imaging optical systems, optical systems for observation, such as binoculars, and projection optical systems for use in liquid crystal projectors, using these optical members; various optical lenses, such as scanning optical systems, for use in laser-beam printers; and optical members, such as covers for various measuring instruments and windowpanes for automobiles and trains.

The invention claimed is:

1. An optical member, comprising a laminated body that can reduce the reflection of light formed on a substrate surface, wherein the laminated body includes a layer having a textured structure composed of aluminum oxide crystals and a polyimide layer containing a polyimide, the polyimide layer being formed between the substrate and the layer having a textured structure, wherein the layer having the textured structure is formed by processing an aluminum oxide film with water at a temperature of 40° C. to 100° C., and the polyimide contains a repeating unit represented by the following general formula (2), and 90% by mole or more of a 1,4-cyclohexylene group in the main chain in the general formula (2) is a trans-1,4-cyclohexylene group:

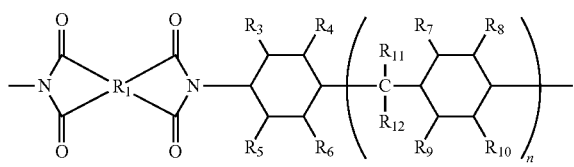

(2)

wherein $R_1$ denotes a tetravalent organic group, n denotes an integer in the range of 0 to 2, $R_3$ to $R_{10}$ independently denote a hydrogen atom, a halogen atom, a phenyl group, or a linear or cyclic alkyl, alkenyl, or alkynyl group having 1 to 6 carbon atoms, and $R_{11}$ and $R_{12}$ independently denote a hydrogen atom or a linear or cyclic alkyl group having 1 to 6 carbon atoms, and wherein $R_1$ is represented by any of the following general formulae (7) to (11)

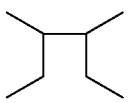

(7)

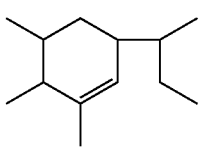

(8)

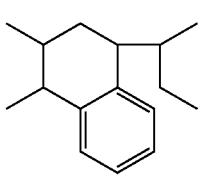

(9)

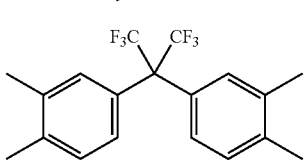

(10)

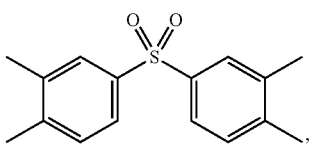

(11)

wherein n in the repeating unit represented by the general formula (2) is 1.

2. The optical member according to claim 1, wherein the polyimide content of the polyimide layer is 70% by weight or more.

3. The optical member according to claim 1, wherein the polyimide is soluble in an organic solvent.

4. The optical member according to claim 1, wherein the polyimide layer has a thickness of 10 nm or more and 150 nm or less.

5. The optical member according to claim 1, wherein the layer having a textured structure composed of aluminum oxide crystals is formed of plate crystals containing 70% by mole or more of aluminum oxide.

6. The optical member according to claim 1, wherein the layer having a textured structure composed of aluminum oxide crystals is formed of crystals mainly composed of an oxide of aluminum, a hydrate of an oxide of aluminum, or a hydroxide of aluminum.

7. The optical member according to claim 6, wherein the aluminum oxide crystals are boehmite.

* * * * *